(12) United States Patent
Liu et al.

(10) Patent No.: US 10,271,317 B2
(45) Date of Patent: Apr. 23, 2019

(54) METHOD, DEVICE AND SYSTEM FOR UPLINK SYNCHRONIZATION

(71) Applicant: ZTE Corporation, Shenzhen (CN)

(72) Inventors: Wenhao Liu, Shenzhen (CN); Senbao Guo, Shenzhen (CN); Feng Bi, Shenzhen (CN); Guanghui Yu, Shenzhen (CN); Zhaohua Lu, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 0 days.

(21) Appl. No.: 15/511,962

(22) PCT Filed: May 6, 2015

(86) PCT No.: PCT/CN2015/078393
§ 371 (c)(1),
(2) Date: Mar. 16, 2017

(87) PCT Pub. No.: WO2016/041358
PCT Pub. Date: Mar. 24, 2016

(65) Prior Publication Data
US 2017/0265184 A1     Sep. 14, 2017

(30) Foreign Application Priority Data
Sep. 17, 2014 (CN) .......................... 2014 1 0476739

(51) Int. Cl.
*H04W 72/04* (2009.01)
*H04B 7/04* (2017.01)
(Continued)

(52) U.S. Cl.
CPC .......... *H04W 72/0413* (2013.01); *H04B 7/04* (2013.01); *H04B 7/0617* (2013.01);
(Continued)

(58) Field of Classification Search
CPC ............. H04W 72/0413; H04W 16/28; H04W 56/0005; H04W 56/001; H04W 72/046;
(Continued)

(56) References Cited

U.S. PATENT DOCUMENTS

| | | | |
|---|---|---|---|
| 2013/0021952 A1 | 1/2013 | Jeong et al. | |
| 2014/0010178 A1 | 1/2014 | Yu et al. | |
| 2014/0211731 A1* | 7/2014 | Inoue | H04B 7/0456 370/329 |
| 2015/0382205 A1* | 12/2015 | Lee | H04B 7/0417 370/329 |

FOREIGN PATENT DOCUMENTS

| | | |
|---|---|---|
| CN | 101427595 A | 5/2009 |
| CN | 103733542 A | 4/2014 |

(Continued)

OTHER PUBLICATIONS

International Search Report for corresponding application PCT/CN2015/078393 filed on May 6, 2015; dated Aug. 6, 2015.
(Continued)

*Primary Examiner* — Duc C Ho
(74) *Attorney, Agent, or Firm* — Cantor Colburn LLP

(57) ABSTRACT

A method, device and system for uplink synchronization are provided, which relate to a LTE-Advanced system and solve the problem that a first communication node and a second communication node may not perform normal communication. The method includes: the first communication node configures resource set information corresponding to N uplink receiving beam groups, wherein N>0 and each uplink receiving beam group includes at least one uplink receiving beam; the first communication node detects uplink access signals on resource sets corresponding to one or more receiving beams according to the resource set information; and the first communication node sends uplink access response messages in responsive to uplink access signals meeting an uplink access condition after detecting the uplink access signals.

20 Claims, 7 Drawing Sheets

(51) Int. Cl.
*H04B 7/06* (2006.01)
*H04L 5/00* (2006.01)
*H04W 16/28* (2009.01)
*H04W 56/00* (2009.01)

(52) U.S. Cl.
CPC ......... *H04B 7/0623* (2013.01); *H04L 5/0053* (2013.01); *H04W 16/28* (2013.01); *H04W 56/001* (2013.01); *H04W 56/0005* (2013.01); *H04W 72/046* (2013.01); *H04W 72/0446* (2013.01); *H04W 72/0453* (2013.01); *H04W 72/0466* (2013.01)

(58) Field of Classification Search
CPC .......... H04W 72/0453; H04W 72/0466; H04B 7/0617; H04B 7/0623; H04L 5/0053
See application file for complete search history.

(56) References Cited

FOREIGN PATENT DOCUMENTS

| WO | 0203721 A2 | 1/2002 |
| WO | 2014027868 A1 | 8/2012 |
| WO | 2014027868 A1 | 2/2014 |
| WO | 2014116928 A1 | 7/2014 |

OTHER PUBLICATIONS

Supplementary European Search Report Application No. EP15842659; dated Aug. 24, 2017; pp. 7.

* cited by examiner

METHOD, DEVICE AND SYSTEM FOR UPLINK SYNCHRONIZATION

TECHNICAL FIELD

The present disclosure relates to a Long Term Evolution Advanced (LTE-Advanced) system in the field of communications, and more particularly to an uplink synchronization method, device and system for implementing uplink receiving beam index processing.

BACKGROUND

In a millimeter wave communication system, adopting a high carrier frequency for data transmission may make average path loss higher than that of an LTE system. For example, if a carrier frequency of 28 GHz is adopted for transmission, the following formula is utilized:

$$L_f = \left(\frac{4\pi R}{\lambda}\right)^2,$$

where R is a coverage radius of a cell, is a wavelength of a corresponding carrier and $L_f$ is a path loss value.

Average proportion information of a high-frequency path loss value and an LTE path loss value is calculated to be:

$$L_H/L_L = \left(\frac{4\pi R}{\lambda_H}\right)^2 / \left(\frac{4\pi R}{\lambda_L}\right)^2 = \left(\frac{\lambda_L}{\lambda_H}\right)^2 \approx 100,$$

$L_H$ represents the high-frequency path loss value and $L_L$ represents the LTE path loss value.

In order to ensure coverage, namely meet a minimum Signal to Interference plus Noise Ratio (SINR) requirement on a receiving side in high-frequency communication, it is necessary to increase sender and receiver gains.

$$P_r = P_t G_t G_r \left(\frac{\lambda}{4\pi R}\right)^2 = P_t G_t G_r / L_f,$$

where $G_t$ is a sending antenna gain, $G_r$ is a receiving antenna gain, $P_t$ is sending antenna power and $P_r$ is receiving antenna power.

LTE communication requires area coverage which maximally reaches 100 km, and area coverage of high-frequency communication may maximally reach 1 km if only average path loss (an open area) is considered according to maximum coverage. If characteristics of air absorption (oxygen absorption, carbon dioxide and the like), rain attenuation, shadow fading sensitivity and the like of an actual high-frequency carrier are considered, coverage which may actually be supported is smaller than 1 km.

If high-frequency communication supports maximum coverage of 1 km, an SINR different from that of an LTE system may be obtained for the same coverage area, and a signal to noise ratio of the former is at least 20 dB lower than that of the latter. In order to ensure that high-frequency communication and the LTE system have approximate SINRs within the same coverage, it is necessary to ensure an antenna gain of high-frequency communication. High-frequency communication has a smaller wavelength, so that accommodation of more antenna elements on a unit area may be ensured, and more antenna elements may provide a higher antenna gain, thereby ensuring coverage performance of high-frequency communication.

Accommodation of more antenna elements means that a beamforming manner may be adopted to ensure coverage of high-frequency communication, and a narrower beam requires more accurate beam alignment of a sender and a receiver. From an LTE-related design concept, it can be seen that achieving a better beamforming effect requires channel state information to be accurately obtained, thereby obtaining a beamforming weight from the channel state information. For obtaining a better beamforming weight, a second communication node serving as a receiver is required to feed back downlink channel state information or weight for a first communication node serving as a sender, and for the receiver, the sender is required to feed back uplink channel state information or weight, so that it is ensured that the first communication node may send a downlink service by adopting an optimal beam and the second communication node may also send an uplink service by adopting an optimal beam. In such a case, there may exist the following problem: the first communication node may not cover the receiver by utilizing the optimal beam before obtaining the weight, so that the receiver may not measure a reference signal sent by the first communication node, or although the first communication node covers the second communication node, the first communication node may not learn about a content fed back by the second communication node which may not reach the same coverage of the first communication node, so that beam weight selection and normal communication may not be performed.

SUMMARY

In the following embodiments of the present disclosure, a method, device and system are provided, so as to solve the problem that a first communication node and a second communication node cannot perform normal communication.

In one aspect, the present disclosure relates to a method for uplink synchronization. As shown in the FIG. 10, the method may include: S1002, a first communication node configures resource set information corresponding to N uplink receiving beam groups, wherein N>0 and each uplink receiving beam group may include at least one uplink receiving beam. S1004, the first communication node detects uplink access signals on resource sets corresponding to one or more receiving beams according to the resource set information. S1006, the first communication node sends uplink access response messages in responsive to uplink access signals meeting an uplink access condition after detecting the uplink access signals.

In certain embodiments, the first communication node configures the resource set information corresponding to the N uplink receiving beam groups may include at least one of the following manners: the first communication node sends the resource set information corresponding to the uplink receiving beam groups to a second communication node through a broadcast and/or high-layer signaling; and a first communication node which has established a connection with the second communication node and corresponds to another carrier sends the resource set information corresponding to the uplink receiving beam groups to the second communication node through high-layer signaling, wherein the first communication node corresponding to the other carrier may be the local first communication node or another first communication node at a separate physical location.

In certain embodiments, the method may further include: the first communication node predetermines the corresponding resource set information with the second communication node.

In certain embodiments, the resource set information corresponding to the uplink receiving beam groups may be divided in any one or more of the following manners: different uplink receiving beams are divided by utilizing frequency-domain resource sets; different uplink receiving beams are divided by utilizing time-domain resource sets; and different uplink receiving beams are divided by utilizing code-domain resource sets.

In certain embodiments, the uplink access response messages may include any one or more of the following information: frequency-domain resource sets corresponding to the uplink access signals; time-domain resource sets corresponding to the uplink access signals; and code-domain resource sets corresponding to the uplink access signals.

In certain embodiments, the uplink access response messages may further include: uplink access signal Preamble Quality Indicators (PQIs) which indicate quality of the uplink access signals received by the first communication node.

In certain embodiments, the first communication node may be a base station or a terminal, and the second communication node may be a base station or a terminal.

In another aspect, the present disclosure relates to another method for uplink synchronization. In certain embodiments, the method may include: a second communication node receives resource set information configured by a first communication node and corresponding to N uplink receiving beam groups, and sends uplink access signals by adopting uplink transmitting beams on M corresponding resource sets according to the resource set information, wherein $M>0$, $N>0$, $1<=M<=N$ and each uplink receiving beam group may include at least one uplink receiving beam. The second communication node receives uplink access response messages fed back by the first communication node.

In certain embodiments, the second communication node may send the uplink access signals by adopting the uplink transmitting beams in the following manner: the second communication node divides the uplink transmitting beams into M groups, and sends different uplink access signals by adopting different uplink transmitting beam groups, wherein $M>0$, each uplink transmitting beam group may include at least one uplink transmitting beam, and each grouped uplink transmitting beam may be uniquely confirmed through a corresponding group index and an intra-group index.

In certain embodiments, the step that the second communication node receives the uplink access response messages fed back by the first communication node may be implemented as follows: the second communication node receives the uplink access response messages on different uplink access resource sets, wherein the different uplink access resource sets being any one of: different time resource sets, different frequency resource sets; and different beam resource sets. The second communication node determines a corresponding group index and intra-group index of an uplink transmitting beam meeting an uplink access condition according to the uplink access response messages corresponding to the different uplink access resource sets.

In certain embodiments, the second communication node may divide the uplink transmitting beams into multiple uplink transmitting beam groups according to any one or more of the following manners: different beams correspond to different time resource sets; different beams correspond to different frequency resource sets; and different beams correspond to different sequence resource sets.

In certain embodiments, the second communication node may divide the uplink transmitting beams into multiple uplink transmitting beam groups according to any one or more of the following manners: different groups correspond to different time resource sets; different groups correspond to different frequency resource sets; and different groups correspond to different sequence resource sets.

In certain embodiments, the first communication node may be a base station or a terminal, and the second communication node may be a base station or a terminal.

In yet another aspect, the present disclosure relates to a device for uplink synchronization. in certain embodiments, the device may include: a resource set configuration module, configured to configure resource set information corresponding to N uplink receiving beam groups, wherein $N>0$ and each uplink receiving beam group may include at least one uplink receiving beam; an uplink access signal receiving module, configured to detect uplink access signals on resource sets corresponding to one or more receiving beams according to the resource set information; and a response message sending module, configured to send uplink access response messages in responsive to uplink access signals meeting an uplink access condition after the uplink access signals are detected.

In certain embodiments, the resource set configuration module may include: a first configuration unit, configured to send the resource set information corresponding to the uplink receiving beam groups to a second communication node through a broadcast and/or high-layer signaling; and a second configuration unit, configured to, by a first communication node which has established a connection with the second communication node and corresponds to another carrier, send the resource set information corresponding to the uplink receiving beam groups to the second communication node through high-layer signaling, wherein the first communication node corresponding to the other carrier may be a local first communication node or another first communication node at a separate physical location.

In certain embodiments, the device may further include: a pre-configuration module, configured to predetermine the corresponding resource set information with the second communication node.

In yet another aspect, the present disclosure relates to another device for uplink synchronization. In certain embodiments, the device may include: an uplink access signal sending module, configured to receive resource set information configured by a first communication node and corresponding to N uplink receiving beam groups, and send uplink access signals by adopting uplink transmitting beams on M corresponding resource sets according to the resource set information, wherein $M>0$, $N>0$, $1<=M<=N$ and each uplink receiving beam group may include at least one uplink receiving beam; and a response receiving module, configured to receive uplink access response messages fed back by the first communication node.

In certain embodiments, the uplink access signal sending module may include: a first sending unit, configured to divide the uplink transmitting beams into M groups, and send different uplink access signals by adopting different uplink transmitting beam groups, wherein $M>0$, each uplink transmitting beam group may include at least one uplink transmitting beam, and each grouped uplink transmitting beam may be uniquely confirmed through a corresponding group index and an intra-group index.

In certain embodiments, the response receiving module may include: a first receiving unit, configured to receive the uplink access response messages on different uplink access resource sets, the different uplink access resource sets being any one of: different time resource sets, different frequency resource sets, and different beam resource sets; and an index confirmation unit, configured to determine a corresponding group index and intra-group index of an uplink transmitting beam meeting an uplink access condition according to the uplink access response messages corresponding to the different uplink access resource sets.

In a further aspect, the present disclosure relates to a system for uplink synchronization. In certain embodiments the system may include a first communication node and a second communication node. The first communication node may be configured to configure resource set information corresponding to N uplink receiving beam groups, wherein N>0 and each uplink receiving beam group may include at least one uplink receiving beam, detect uplink access signals on resource sets corresponding to one or more receiving beams according to the resource set information, and send uplink access response messages in responsive to uplink access signals meeting an uplink access condition after detecting the uplink access signals. The second communication node may be configured to receive the resource set information, configured by the first communication node, corresponding to the N uplink receiving beam groups, send the uplink access signals by adopting uplink transmitting beams on M corresponding resource sets according to the resource set information, wherein M>0, N>0, 1<=M<=N and each uplink receiving beam group may include at least one uplink receiving beam, and receive the uplink access response messages fed back by the first communication node.

In certain embodiments, the first communication node may be a base station or a terminal, and the second communication node may be a base station or a terminal.

In another further aspect, the present disclosure relates to a computer storage medium, in which a computer-executable instruction may be stored, and the computer-executable instruction being configured to execute the abovementioned method.

As explained in the provided uplink synchronization methods, devices and system, the first communication node configures the resource set information corresponding to the N uplink receiving beam groups, wherein N>0 and each uplink receiving beam group includes at least one uplink receiving beam; and then the first communication node detects the uplink access signals on the resource sets corresponding to the one or more receiving beams according to the resource set information, and sends the uplink access response messages to the uplink access signals meeting the uplink access condition after detecting the uplink access signals. The second communication node receives the resource set information, configured by the first communication node, corresponding to the N uplink receiving beam groups, and sends the uplink access signals by adopting the uplink transmitting beams on the M corresponding resource sets according to the resource set information, wherein M>0, N>0 and 1<=M<=N; and the second communication node receives the uplink access response messages fed back by the first communication node. By utilizing the above provided technical solutions, configuration confirmation of both communication parties about uplink access beams is implemented, and the problem that the first communication node and the second communication node may not perform normal communication is solved.

DETAILED DESCRIPTION OF THE EMBODIMENTS

Figure 1:
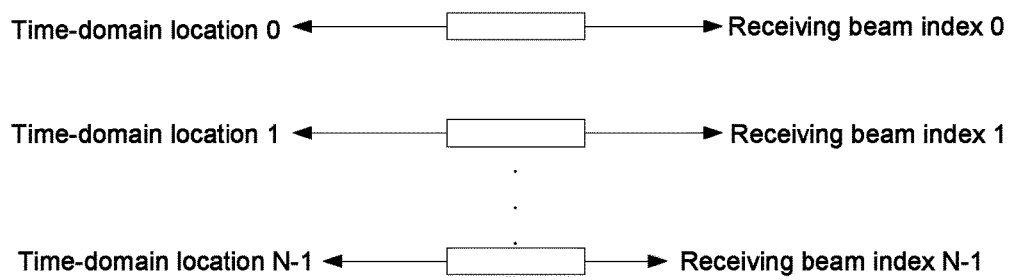
FIG. 1 is a schematic diagram of indicating receiving beam indexes by utilizing time-domain resource sets according to an embodiment of the present disclosure.

For obtaining a better beamforming weight, a second communication node serving as a receiver is required to feed back downlink channel state information or weight for a first communication node serving as a sender, and for the receiver, the sender is required to feed back uplink channel state information or weight, so that it is ensured that the first communication node may send a downlink service by adopting an optimal beam and the second communication node may also send an uplink service by adopting an optimal beam. In such a case, there may exist the following problem: the first communication node may not cover the receiver by utilizing the optimal beam before obtaining the weight, so that the receiver may not measure a reference signal sent by the first communication node, or although the first communication node covers the second communication node, the first communication node may not learn about a content fed back by the second communication node which may not reach the same coverage of the first communication node, so that beam weight selection and normal communication may not be performed.

The embodiments of the present disclosure will be described in detail with reference to the drawings. It is important to note that the embodiments in the present disclosure and characteristics in the embodiments may be reasonably combined under the condition of no conflicts.

During a practical application, a discovery process may be applied, and by this discovery process, a first communication node and a second communication node may be discovered by each other, thereby performing communication by utilizing optimal weights.

The discovery process may be considered as a training process, a sender sends resource sets corresponding to a plurality of uplink receiving beams and resource sets configured to send uplink access signals, then a receiver may know about resource set information of these uplink receiving beams, and a second communication node serving as the receiver may further send the uplink access signals on the resource sets, preset by a first communication node serving as the sender, for the uplink access signals in a beamforming manner according to own antenna capability. The sender may send the resource sets corresponding to the uplink receiving beams through a conventional 4th-Generation (4G) (such as LTE) carrier, and may also send them on a high-frequency carrier. After the second communication node send the uplink access signals in the beamforming manner, the first communication node may determine an optimal uplink access beam direction according to quality of the uplink access signals received by the receiving beams. The first communication node sends uplink response messages carrying uplink access quality indications to the second communication node.

There are many methods for defining the quality of the uplink access signals. For example, the quality of the uplink access signals may further be quantified into a plurality of bits by adopting ratios of detection values of the uplink access signals to noise, or ratios of the detection values of the uplink access signals to a certain threshold or the like.

On a first communication node side, the first communication node may notify the second communication node that the first communication node indicates the resource set information corresponding to uplink receiving beam groups by adopting at least one of the following beam indication manners and related configuration information when receiving the uplink access signals through in a predefinition or high-layer signaling or broadcast manner: the resource set information of the uplink receiving beam groups for receiving the uplink access signals is indicated by adopting uplink access signal time-domain resource sets; the resource set information of the uplink receiving beam groups for receiving the uplink access signals is indicated by adopting uplink access signal frequency-domain resource sets; and the resource set information of the uplink receiving beam groups for receiving the uplink access signals is indicated by adopting uplink access signal sequence resource sets.

In the predefinition manner, the first communication node may receive the uplink access signals sent by the second communication node in at least one of the following beam recognition manners: the uplink access signals on the predefined time-domain resource sets are detected; the uplink access signals on the predefined frequency-domain resource sets are detected; and code sequences adopted for the uplink access signals are detected according to the predefined uplink access signal sequence sets.

The first communication node may detect the uplink access signals according to the beam recognition manners by adopting the predefinition manner.

The first communication node may notify the second communication node of the resource set information of the uplink receiving beam groups of the first communication node by adopting the broadcast and/or the high-layer signaling manner.

If being covered by both a conventional network and a high-frequency network, the second communication node may send high-layer signaling through the conventional network which has been connected, and may also be send it through a broadcast channel of the high-frequency network.

The first communication node may divide the uplink receiving beams into N groups, wherein N>0 and each group includes at least one receiving beam.

When the first communication node divides the beam groups by utilizing the uplink access signal time-domain resource sets to receive the uplink access signals sent by the second communication node, the first communication node may notify a corresponding relationship between an uplink receiving beam group and time-domain resource set information for uplink access signals through a broadcast and/or high-layer signaling.

When the first communication node divides the beam groups by utilizing the uplink access signal frequency-domain resource sets to receive the uplink access signals sent by the second communication node, the first communication node may notify a corresponding relationship between an uplink receiving beam group and a frequency-domain resource set for uplink access signals through the broadcast and/or the high-layer signaling.

When the first communication node divides the beam groups by utilizing uplink access signal code-domain resource sets to receive the uplink access signals sent by the second communication node, the first communication node may notify a corresponding relationship between an uplink receiving beam group and code-domain resource set information for uplink access signals through the broadcast and/or the high-layer signaling, wherein different code-domain resource sets correspond to different sequences.

When the first communication node divides the beam groups by utilizing the uplink access signal time-domain resource sets to receive the uplink access signals sent by the second communication node, the first communication node and the second communication node should have a consistent corresponding relationship between a predefined time-domain resource set and an uplink receiving beam index in the predefinition manner.

When the first communication node divides the beam groups by utilizing the uplink access signal frequency-domain resource sets to receive the uplink access signals sent by the second communication node, the first communication node and the second communication node should have a consistent corresponding relationship between a predefined frequency-domain resource set and an uplink receiving beam index in the predefinition manner.

When the first communication node divides the beam groups by utilizing the uplink access signal code-domain resource sets to receive the uplink access signals sent by the second communication node, the first communication node and the second communication node should have a consistent corresponding relationship between a predefined code-domain resource set and an uplink receiving beam index in the predefinition manner.

On a second communication node side, the second communication node may learn about adoption of at least one of the following beam indication manners and related configuration information for recognizing uplink transmitting beam indexes in the predefinition manner and/or receiving the broadcast and/or the high-layer signaling: the uplink transmitting beam indexes for the uplink access signals are distinguished by adopting time-domain resource sets for sending the uplink access signals; the uplink transmitting beam indexes for the uplink access signals are distinguished by adopting frequency-domain resource sets for sending the uplink access signals; the uplink transmitting beam indexes for the uplink access signals are distinguished by adopting code-domain resource sets for sending the uplink access signals; wherein uplink transmitting beam indexes refer to resource sets which are determined by receiving the resource sets, notified by the first communication node, for the uplink access signals by the second communication node and correspond to each uplink beam.

In the predefinition manner, the second communication node may distinguish uplink transmitting beam index information through at least one of the following uplink transmitting beam indication manners: the uplink access signals are sent on the predefined time-domain resource sets to distinguish the uplink transmitting beam index information; the uplink access signals are sent on the predefined frequency-domain resource sets to distinguish the uplink transmitting beam index information; and the uplink access signals are sent to distinguish the uplink transmitting beam index information by selecting one or more sequences from predefined uplink access signal sequence sets, wherein each uplink access signal sequence set includes at least one uplink access signal sequence.

When the second communication node sends the uplink access signals, indication information of downlink beam index recognition is carried and fed back.

The second communication node feeds back the indication information of downlink beam index recognition by adopting at least one of the following manners: the feedback is given through the time-domain resource sets; the feedback is given through the frequency-domain resource sets; and the feedback is given through the code-domain resource sets.

The second communication node may obtain the beam indication manner by adopting the predefinition manner.

The second communication node may obtain the beam indication manner by receiving the broadcast and/or the high-layer signaling.

When the second communication node feeds back downlink beam indexes by utilizing the time-domain resource sets, the second communication node obtains a corresponding relationship between a time-domain resource set and a downlink beam index by adopting the manner of receiving the broadcast and/or the high-layer signaling.

When the second communication node feeds back the downlink beam indexes by utilizing the frequency-domain resource sets, the second communication node obtains a corresponding relationship between a frequency-domain resource set and a downlink beam index by adopting the manner of receiving the broadcast and/or the high-layer signaling.

When the second communication node feeds back the downlink beam indexes by utilizing the uplink access signal sequences, the second communication node obtains a corresponding relationship between an uplink access signal sequence set and a downlink beam index by adopting the manner of receiving the broadcast and/or the high-layer signaling.

When the second communication node feeds back the downlink beam indexes by utilizing the time-domain resource sets, the second communication node and the first communication node should have a consistent corresponding relationship between a predefined time-domain resource set and a downlink beam index by adopting the predefinition manner.

When the second communication node feeds back the downlink beam indexes by utilizing the frequency-domain resource sets, the second communication node and the first communication node should have a consistent corresponding relationship between a predefined frequency-domain resource set and a downlink beam index by adopting the predefinition manner.

When the second communication node feeds back the downlink beam indexes by utilizing the uplink access signal sequences, the second communication node and the first communication node should have a consistent corresponding relationship between a predefined sequence set and a downlink beam index by adopting the predefinition manner.

When the second communication node sends the uplink access signals in a grouped beamforming manner, the second communication node may distinguish uplink transmitting beam group indexes in at least one of the following beam indication manners: different uplink transmitting beam group indexes are distinguished by utilizing the uplink access signal time-domain resource sets; different uplink transmitting beam group indexes are distinguished by utilizing the uplink access signal frequency-domain resource sets; different uplink transmitting beam group indexes are distinguished by utilizing the uplink access signal sequence sets; and different uplink transmitting beam group indexes are distinguished by utilizing a combination of abovementioned two and more than two.

For better understanding of the present disclosure, the present disclosure will be further described below with reference to the drawings and exemplary embodiments.

During a practical system application, a concept of a beam refers to that the beam may reduce leakage of signal power of a first communication node in a useless direction to ensure a directional characteristic of the signal power and enhance coverage of the first communication node.

A downlink beam index is used to enable the first communication node to find a corresponding beam, and related information of the index may actually be fed back, for example: a time-domain resource set index, a frequency-domain resource set index and a downlink signal sequence index or a value equivalent to these indexes. Any index related or equivalent to the downlink beam index in the embodiments of the present disclosure falls within the scope of protection of the present disclosure.

Embodiment 1

Figure 2:
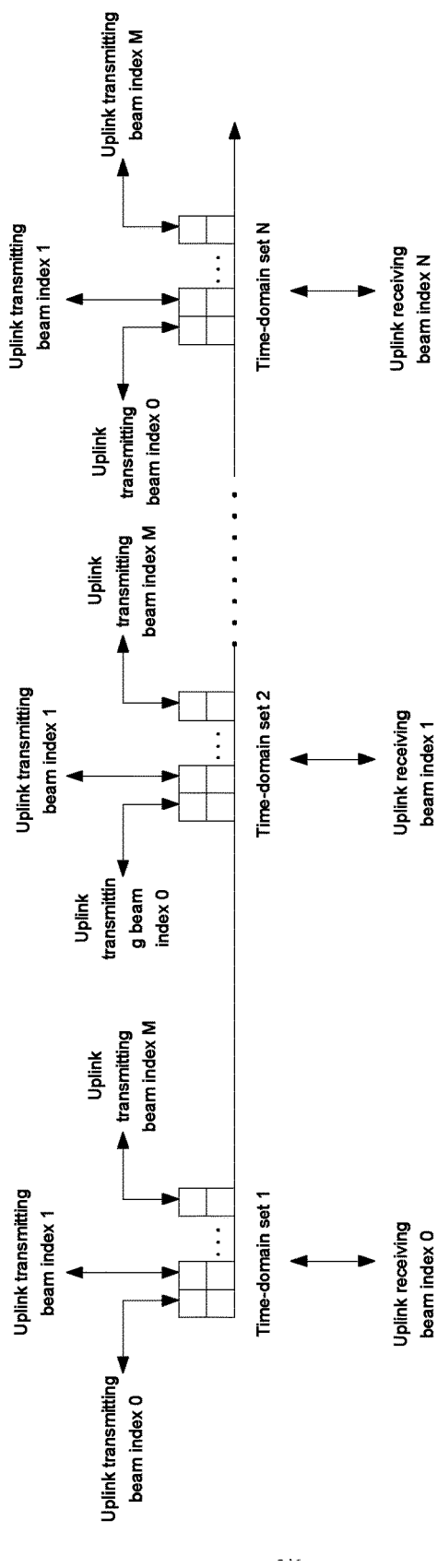
FIG. 2 is a schematic diagram of indicating receiving beam indexes by utilizing time-domain resource sets according to an embodiment of the present disclosure.

As shown in FIG. 2, it is supposed that a base station receives uplink access signals by utilizing N uplink receiving beams, and the receiving beams may cover an area required to be covered by the base station.

The base station and a terminal predefine N time-domain resource sets corresponding to N uplink receiving beam indexes respectively.

In an alternative way, the base station notifies a corresponding relationship between the N time-domain resource sets and N uplink receiving beam groups respectively through a broadcast and/or high-layer signaling. The base station notifies the terminal through the broadcast, or another base station which has established a connection with the same terminal within the same coverage notifies the terminal through the high-layer signaling.

If the terminal obtains the corresponding relationship between the N time-domain resource sets and the N uplink receiving beam groups respectively through the broadcast and/or the high-layer signaling, the terminal is required to receive the broadcast and/or the high-layer signaling at first to obtain the corresponding relationship.

After the terminal obtains a corresponding relationship between the N time-domain resource sets and the N uplink receiving beam indexes respectively, uplink access signals are sent to different uplink receiving beam groups on the corresponding time-domain resource sets in a beamforming manner. The base station receives the uplink access signals on different uplink receiving beam groups according to predetermined time, and receiving conditions of different uplink receiving beams of the base station are recognized. For example, as shown in FIG. 1, wherein the time-domain resource sets may include sets of multiple time units. The time units may be micro-frames, sub-frames, half frames, radio frames, elementary time units and the like.

The base station sends uplink access response messages to the terminal in the beamforming manner after receiving the uplink access signals sent by the terminal, and the uplink access response messages carry uplink access recognition information. The uplink access response messages sent by the base station may further carry uplink access PQIs.

The terminal recognizes uplink transmitting beams meeting uplink transmission after receiving the response messages.

Example 1

It is supposed that the base station may substantially cover an uplink receiving area required to be covered by the base station by utilizing 8 uplink receiving beam groups. The base station and the terminal predefine that 8 resource sets correspond to the 8 uplink receiving beam groups respectively, or the base station notifies the terminal of a corresponding relationship between the 8 time-domain resource sets and the 8 uplink receiving beam groups respectively through a broadcast and/or high-layer signaling, as shown in Table 1, wherein the time-domain resource sets may include occupied time unit indexes and/or durations, wherein the durations may be embodied by numbers of included time units, wherein the durations may also be time-domain repetition frequencies of uplink access signals.

TABLE 1

| Uplink receiving beam group index | Time-domain resource set for sending uplink access signals |
| --- | --- |
| 0 | Time-domain resource set 0 |
| 1 | Time-domain resource set 1 |
| ... | ... |
| 7 | Time-domain resource set 7 |

It is supposed that the terminal detects downlink signals and receives a broadcast message of the base station to recognize resource set information for the uplink access signals, and at this moment, the terminal sends the uplink access signals on the time-domain resource sets corresponding to different uplink receiving beam groups.

It is supposed that the terminal may substantially cover an uplink transmitting area required to be covered by the terminal by utilizing 4 uplink transmitting beams. The terminal sends uplink access signals for many times on the same uplink receiving beam time resource set to cover different uplink receiving and transmitting beams in a time division manner, an uplink beam relationship being shown in Table 2.

TABLE 2

| Uplink receiving beam group index | Uplink transmitting beam index |
| --- | --- |
| 0 | 0 |
|  | 1 |
|  | 2 |
|  | 3 |
| 1 | 0 |
|  | 1 |
|  | 2 |
|  | 3 |
| ... | ... |
| 7 | 0 |
|  | 1 |
|  | 2 |
|  | 3 |

In Table 2, the terminal distinguishes the uplink transmitting beams according to uplink transmitting time-domain resource sets. The base station divides the receiving beam groups into 8 time-domain resource sets to detect the uplink access signals.

The terminal sends the uplink access signals on different uplink transmitting beams on the time resource set corresponding to each uplink receiving beam.

The base station sends uplink access response messages according to the received uplink access signals after receiving the uplink access signals of the terminal on different uplink receiving beam groups.

The terminal recognizes uplink transmitting beams meeting uplink transmission after receiving the response messages.

Example 2

It is supposed that the base station may substantially cover the uplink receiving area required to be covered by the base station by utilizing 16 uplink receiving beam groups. The base station and the terminal predefine that 16 time-domain resource sets correspond to the 16 uplink receiving beam groups respectively, or the base station notifies the terminal of a corresponding relationship between the 16 time-domain resource sets and the 16 uplink receiving beam groups respectively through a broadcast and/or high-layer signaling, as shown in Table 3.

The base station may notify the terminal through the broadcast and/or high-layer signaling of the local base station, or another base station which has established a connection with the same terminal within the same coverage notifies the terminal through high-layer signaling.

the time-domain resource sets may include occupied time unit indexes and/or durations, wherein the durations may be embodied by numbers of included time units, wherein the durations may also be time-domain repetition frequencies of uplink access signals.

TABLE 3

| Uplink receiving beam group index | Time-domain resource set for sending uplink access signals |
| --- | --- |
| 0 | Time-domain resource set 0 |
| 1 | Time-domain resource set 1 |
| ... | ... |
| 15 | Time-domain resource set 15 |

The terminal detects downlink signals and receives the broadcast and/or high-layer signaling of the base station to recognize time-domain resource set information of uplink transmitting beams, and at this moment, the terminal sends the uplink access signals to different uplink receiving beam groups on the corresponding time-domain resource sets.

It is supposed that the terminal may substantially cover the uplink transmitting area required to be covered by the terminal by utilizing 4 uplink transmitting beams. The terminal sends uplink access signals for multiple times on the same uplink receiving beam time resource set to cover different uplink transmitting and receiving beams in a time division manner, an uplink beam relationship being shown in Table 4.

TABLE 4

| Uplink receiving beam group index | Uplink transmitting beam index |
|---|---|
| 0 | 0 |
|  | 1 |
|  | 2 |
|  | 3 |
| 1 | 0 |
|  | 1 |
|  | 2 |
|  | 3 |
| ... | ... |
| 15 | 0 |
|  | 1 |
|  | 2 |
|  | 3 |

The base station divides the receiving beams into the 16 time-domain resource sets to detect the uplink access signals, the terminal sends uplink access signals for 4 times on a duration set corresponding to each receiving beam, and the base station sends uplink access response messages according to the received uplink access signals after receiving the uplink access signals sent by the terminal on the uplink receiving beam groups corresponding to the time resource sets.

The terminal recognizes uplink transmitting beams meeting uplink transmission after receiving the response messages.

the beams for the uplink access signals sent for 4 times by the terminal may adopt time-division sending, and may also adopt temporally partially overlapped sending.

Example 3

It is supposed that the base station may substantially cover the uplink receiving area required to be covered by the base station by utilizing 16 uplink receiving beam groups. The base station and the terminal predefine that 16 time-domain resource sets correspond to the 16 uplink receiving beam groups respectively, or the base station notifies the terminal of a corresponding relationship between the 16 time-domain resource sets and the 16 uplink receiving beam groups respectively through a broadcast and/or high-layer signaling, as shown in Table 3.

The base station may notify the terminal through a carrier of the local base station, the broadcast and/or the high-layer signaling, or another base station which has established a connection with the same terminal within the same coverage notifies the terminal through high-layer signaling.

The time-domain resource sets may include occupied time unit indexes and/or durations, wherein the durations may be embodied by numbers of included time units, wherein the durations may also be time-domain repetition frequencies of uplink access signals.

The terminal detects downlink signals and receives the broadcast and/or high-layer signaling of the base station to recognize time-domain resource sets of uplink transmitting beams, and the terminal sends the uplink access signals on the time-domain resource sets corresponding to different uplink receiving beam groups.

It is supposed that the terminal may substantially cover the uplink transmitting area required to be covered by the terminal by utilizing 4 uplink transmitting beams. The terminal sends the uplink access signals for multiple times on the same uplink receiving beam time resource set to cover different uplink receiving and transmitting beams in a time division manner, an uplink beam relationship being shown in Table 4.

TABLE 4

| Uplink receiving beam group | Uplink transmitting beam index |
|---|---|
| 0 | 0 |
|  | 1 |
|  | 2 |
|  | 3 |
| 1 | 0 |
|  | 1 |
|  | 2 |
|  | 3 |
| ... | ... |
| 15 | 0 |
|  | 1 |
|  | 2 |
|  | 3 |

The base station divides the uplink receiving beam groups into the 16 time-domain resource sets to detect the uplink access signals, the terminal sends the uplink access signals for 4 times on a duration set corresponding to each uplink receiving beam, and the base station sends uplink access response messages according to the received uplink access signals after receiving the uplink access signals sent by the terminal in different receiving directions.

The beams for the uplink access signals sent for 4 times by the terminal may adopt time-division sending, and may also adopt temporally partially overlapped sending.

The response messages include uplink receiving signal PQIs, wherein an indicator bit number is nPQI=2, and indicated quality conditions are arranged from low to high according to Table 5 as follows.

TABLE 5

| [b1 b0] | Priority |
|---|---|
| 0 0 | 0 |
| 0 1 | 1 |
| 1 0 | 2 |
| 1 1 | 3 |

The terminal receives response messages, recorded as RAR_txBeam0 and RAR_txBeam2 respectively, of uplink access signals sent by an uplink transmitting beam index 0 and an uplink beam index 2, and PQI fields of RAR_txBeam0 and RAR_txBeam2 are [0 0] and [1 0] respectively. The terminal selects a beam with the uplink transmitting beam index 2 from multiple uplink access responses as an optimal uplink transmitting beam.

Embodiment 2

It is supposed that a base station receives uplink access signals by utilizing N uplink receiving beam groups, and an area required to be covered by the base station may substantially be covered by utilizing the N uplink receiving beam groups. The base station and a terminal predefine that N frequency-domain resource sets correspond to N uplink receiving beam indexes respectively.

In an alternative way, the base station notifies the terminal of a corresponding relationship between the N frequency-domain resource sets and the N uplink receiving beam groups respectively through a broadcast and/or high-layer signaling.

If the terminal obtains the corresponding relationship between the N frequency-domain resource sets and the N uplink receiving beam groups respectively through the broadcast and/or the high-layer signaling, the terminal is required to receive the broadcast and/or the high-layer signaling at first to obtain the corresponding relationship.

Figure 3:
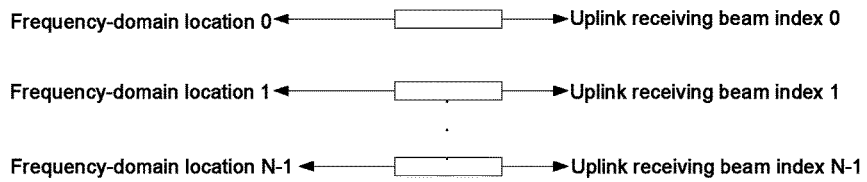
FIG. 3 is a schematic diagram of indicating receiving beam indexes by utilizing frequency-domain resource sets according to an embodiment of the present disclosure.

After the terminal obtains a corresponding relationship between the N time-domain resource sets and the N uplink receiving beam indexes respectively, uplink access signals are sent to different uplink receiving beam groups on the corresponding frequency-domain resource sets in a beamforming manner. For example, as shown in FIG. 3, the base station and the terminal recognize different uplink receiving beam groups through the frequency-domain resource sets only, wherein the frequency-domain resource sets include starting frequency-domain resource locations for sending the uplink access signals and/or frequency-domain bandwidths occupied by the uplink access signals.

The base station sends uplink access response messages to the terminal in the beamforming manner after receiving the uplink access signals sent by the terminal, and the uplink access response messages carry uplink access recognition information. The uplink access response messages sent by the base station may further carry uplink access PQIs.

The terminal recognizes uplink transmitting beams meeting uplink transmission after receiving the response messages.

Example 1

The base station receives the uplink access signals sent by the terminal by utilizing 8 uplink receiving beam groups, and the area required to be covered by the base station may substantially be covered by 8 uplink receiving beams. The base station and the terminal predefine that 8 frequency-domain resource sets correspond to the 8 uplink receiving beam groups respectively, or the base station notifies the terminal of a corresponding relationship between the 8 frequency-domain resource sets and the 8 uplink receiving beam groups respectively through a broadcast and/or high-layer signaling, as shown in Table 6.

TABLE 6

| Uplink receiving beam group | Frequency-domain resource set for sending uplink access signals |
| --- | --- |
| 0 | Frequency-domain resource set 0 |
| 1 | Frequency-domain resource set 1 |
| 2 | Frequency-domain resource set 2 |
| 3 | Frequency-domain resource set 3 |
| 4 | Frequency-domain resource set 4 |
| 5 | Frequency-domain resource set 5 |
| 6 | Frequency-domain resource set 6 |
| 7 | Frequency-domain resource set 7 |

The terminal detects downlink signals and receives the broadcast and/or high-layer signaling of the base station to recognize resource set information for the uplink access signals, and at this moment, the terminal selects the frequency-domain resource sets corresponding to different uplink receiving beams to send the uplink access signals.

The base station detects the uplink access signals on multiple frequency-domain resource sets, and after the base station detects the uplink access signals at the frequency-domain resource set 6, the base station sends uplink access response messages corresponding to the frequency-domain resource set 6 to recognize an optimal uplink receiving beam.

The terminal may confirm an optimal uplink transmitting beam according to an uplink transmitting beam corresponding to the uplink access response messages.

Example 2

It is supposed that the base station receives the uplink access signals sent by the terminal by utilizing 10 uplink receiving beam groups, and the area required to be covered by the base station may substantially be covered by the 10 uplink receiving beam groups. The base station and the terminal predefine that 10 frequency-domain resource sets correspond to the 10 uplink receiving beam groups respectively, or the base station notifies the terminal of a corresponding relationship between the 10 frequency-domain resource sets and the 10 uplink beam groups respectively through a broadcast and/or high-layer signaling, as shown in Table 7.

TABLE 7

| Uplink receiving beam index | Frequency-domain resource set for sending uplink access signals |
| --- | --- |
| 0 | Frequency-domain bandwidth 0 |
| 1 | Frequency-domain bandwidth 1 |
| 2 | Frequency-domain bandwidth 2 |
| 3 | Frequency-domain bandwidth 3 |
| 4 | Frequency-domain bandwidth 4 |
| 5 | Frequency-domain bandwidth 5 |
| 6 | Frequency-domain bandwidth 6 |
| 7 | Frequency-domain bandwidth 7 |
| 8 | Frequency-domain bandwidth 8 |
| 9 | Frequency-domain bandwidth 9 |

The terminal detects downlink signals and receives the broadcast and/or high-layer signaling of the base station to recognize frequency-domain resource set information of the uplink access signals, and at this moment, the terminal selects frequency-domain bandwidths corresponding to different uplink receiving beam groups to send the uplink access signals.

The base station detects the uplink access signals on multiple frequency-domain resource sets, and after the base station detects the uplink access signals at the frequency-domain bandwidth 6, the base station sends uplink access response messages corresponding to the frequency-domain bandwidth 6 to recognize an optimal uplink receiving beam.

The terminal may confirm an optimal uplink transmitting beam according to an uplink transmitting beam corresponding to the uplink access response messages.

Example 3

It is supposed that the base station receives the uplink access signals sent by the terminal by utilizing 16 uplink receiving beam groups, and the area required to be covered by the base station may substantially be covered by 16 uplink receiving beam groups. The base station and the terminal predefine that 16 frequency-domain resource sets correspond to the 16 uplink receiving beam groups respectively, or the base station notifies the terminal of a corresponding relationship between the 16 frequency-domain resource sets and the 16 uplink beam groups respectively through a broadcast and/or high-layer signaling, as shown in Table 8.

TABLE 8

| Uplink receiving beam index | Frequency-domain resource set for sending uplink access signals |
|---|---|
| 0 | Frequency-domain bandwidth 0 |
| 1 | Frequency-domain bandwidth 1 |
| ... | ... |
| 9 | Frequency-domain bandwidth 9 |
| 10 | Frequency-domain bandwidth 10 |
| 11 | Frequency-domain bandwidth 11 |
| 12 | Frequency-domain bandwidth 12 |
| 13 | Frequency-domain bandwidth 13 |
| 14 | Frequency-domain bandwidth 14 |
| 15 | Frequency-domain bandwidth 15 |

The terminal detects downlink signals and receives the broadcast and/or high-layer signaling of the base station to recognize frequency-domain resource set information of the uplink access signals, and at this moment, the terminal selects frequency-domain bandwidths corresponding to different uplink receiving beam groups to send the uplink access signals.

The base station detects the uplink access signals on multiple frequency-domain resource sets, and after the base station detects the uplink access signals at the frequency-domain bandwidth 6, the base station sends uplink access response messages corresponding to the frequency-domain bandwidth 6 to recognize an optimal uplink receiving beam.

The terminal may confirm an optimal uplink transmitting beam according to an uplink transmitting beam corresponding to the uplink access response messages.

Embodiment 3

It is supposed that a base station receives uplink access signals by utilizing N uplink receiving beam groups, and an area required to be covered by the base station may substantially be covered by utilizing the N uplink receiving beam groups. The base station and a terminal predefine that N uplink access signal sequence sets correspond to the N uplink receiving beam groups respectively.

In an alternative way, the base station notifies the terminal of a corresponding relationship between the N uplink access signal sequence sets and the N uplink receiving beam groups respectively through a broadcast and/or high-layer signaling, wherein each uplink access signal sequence set includes at least one uplink access signal sequence. The broadcast and/or the high-layer signaling may be sent to the terminal through the local base station, and high-layer signaling may also be sent to the terminal through another base station which has established a connection with the terminal.

Figure 5:
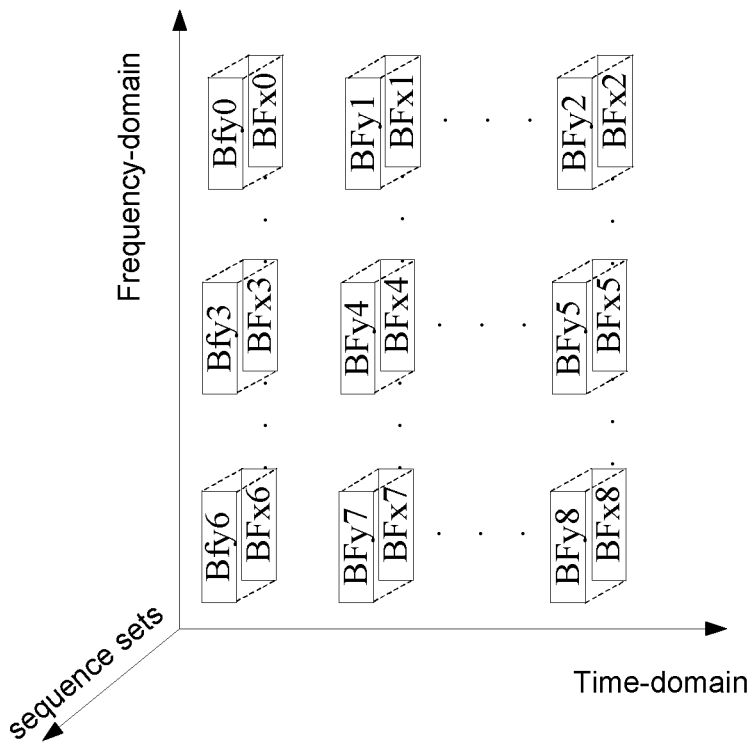
FIG. 5 is a schematic diagram of indicating receiving beam indexes by combining time-domain and frequency-domain resource sets and sequence sets according to an embodiment of the present disclosure.

After the terminal obtains the corresponding relationship between the N uplink access signal sequence sets and the N uplink receiving beam groups, uplink access signals of the corresponding sequence sets are sent to different uplink receiving beam groups in a beamforming manner, for example, as shown in FIG. 5. The base station and the terminal recognize different uplink receiving beam groups through the sequence sets, wherein the sequence sets include at least one sequence configured for the uplink access signals.

The base station sends uplink access response messages to the terminal in the beamforming manner after receiving the uplink access signals sent by the terminal, and the uplink access response messages carry uplink access recognition information. The uplink access response messages sent by the base station may further carry uplink access PQIs.

The terminal recognizes uplink transmitting beams meeting uplink transmission after receiving the response messages.

Example 1

The base station receives the uplink access signals by utilizing 8 uplink receiving beam groups, and the base station may substantially cover the receiving area required to be covered by the base station by utilizing the 8 uplink receiving beam groups. The base station and the terminal predefine that 8 uplink access signal sequence sets correspond to the 8 uplink receiving beam groups respectively, or the base station notifies the terminal of a corresponding relationship between the 8 uplink access signal sequence sets and the 8 uplink receiving beam groups through a broadcast and/or high-layer signaling, as shown in Table 9.

TABLE 9

| Uplink receiving beam group | Uplink access signal sequence set for sending uplink access signals |
|---|---|
| 0 | Uplink access signal sequence set 0 |
| 1 | Uplink access signal sequence set 1 |
| 2 | Uplink access signal sequence set 2 |
| 3 | Uplink access signal sequence set 3 |
| 4 | Uplink access signal sequence set 4 |
| 5 | Uplink access signal sequence set 5 |
| 6 | Uplink access signal sequence set 6 |
| 7 | Uplink access signal sequence set 7 |

The terminal detects downlink signals and receives the broadcast and/or high-layer signaling of the base station to recognize sequence set information for the uplink access signals, and at this moment, the terminal selects one or more sequences in the sequence sets corresponding to different uplink receiving beams to send the uplink access signals.

The base station receives the uplink access sequences corresponding to the uplink receiving beam groups on the uplink receiving beam groups, and when the base station detects that the sequences configured for the uplink access signals are the sequences in the uplink access signal sequence set 6, the base station sends uplink access response messages corresponding to the uplink access signal sequence set 6 to recognize the uplink receiving beam meeting uplink transmission. The base station may subsequently receive uplink data transmitted by the terminal by adopting the uplink receiving beam.

The terminal confirms an uplink transmitting beam meeting uplink transmission according to the received uplink access response messages corresponding to uplink transmitting beams.

Example 2

The base station receives the uplink access signals by utilizing 10 uplink receiving beam groups, and the base station may substantially cover the receiving area required to be covered by the base station by utilizing the 10 uplink receiving beam groups. The base station and the terminal predefine that 10 uplink access signal sequence sets correspond to the 10 uplink receiving beam groups, or the base station notifies the terminal of a corresponding relationship between the 10 uplink access signal sequence sets and the 10 uplink receiving beam groups respectively through a broadcast and/or high-layer signaling, as shown in Table 10.

TABLE 10

| Uplink receiving beam group | Uplink access signal sequence set for sending uplink access signals |
|---|---|
| 0 | Uplink access signal sequence set 0 |
| 1 | Uplink access signal sequence set 1 |
| 2 | Uplink access signal sequence set 2 |
| 3 | Uplink access signal sequence set 3 |
| 4 | Uplink access signal sequence set 4 |
| 5 | Uplink access signal sequence set 5 |
| 6 | Uplink access signal sequence set 6 |
| 7 | Uplink access signal sequence set 7 |
| 8 | Uplink access signal sequence set 8 |
| 9 | Uplink access signal sequence set 9 |

It is supposed that the terminal detects downlink signals and receives the broadcast and/or high-layer signaling of the base station to recognize uplink access signal sequence set information, and at this moment, the terminal selects one or more sequences in the sequence sets corresponding to different uplink receiving beam groups to send the uplink access signals.

The base station receives the uplink access signals on the uplink receiving beam groups, the base station detects that the sequences configured for the uplink access signals are the sequences in the uplink access signal sequence set 6, and the base station sends uplink access response messages corresponding to the uplink access signal sequence set 6 to recognize the uplink receiving beam meeting uplink transmission. The base station may subsequently receive uplink data transmitted by the terminal by adopting the uplink receiving beam.

The terminal confirms an uplink transmitting beam meeting uplink transmission according to the received uplink access response messages corresponding to uplink transmitting beams.

Example 3

The base station receives the uplink access signals by utilizing 32 uplink receiving beam groups, and the base station may substantially cover the receiving area required to be covered by the base station by utilizing the 32 uplink receiving beam groups. The base station and the terminal predefine that 32 uplink access signal sequence sets correspond to the 32 uplink receiving beam groups, or the base station notifies the terminal of a corresponding relationship between the 32 uplink access signal sequence sets and the 32 uplink receiving beam groups respectively through a broadcast and/or high-layer signaling, as shown in Table 11.

TABLE 11

| Uplink receiving beam group | Uplink access signal sequence set for sending uplink access signals |
|---|---|
| 0 | Uplink access signal sequence set 0 |
| 1 | Uplink access signal sequence set 1 |
| ... | ... |
| 31 | Uplink access signal sequence set 31 |

It is supposed that the terminal has established a connection with a conventional node within the same coverage before establishing a connection with the accessing base station, and the conventional node notifies the terminal of uplink access signal resource configurations of the uplink receiving beam groups in a high-layer signaling manner. Here, the conventional node with which the connection has been established is an LTE node, and the accessing base station is a millimeter wave node.

The base station receives the uplink access signals on the uplink receiving beam groups, the base station detects that the sequences configured for the uplink access signals are the sequences in the uplink access signal sequence set 6, and the base station sends uplink access response messages corresponding to the uplink access signal sequence set 6 to recognize the uplink receiving beam meeting uplink transmission. The base station may subsequently receive uplink data transmitted by the terminal by adopting the uplink receiving beam.

The terminal confirms an uplink transmitting beam meeting uplink transmission according to the received uplink access response messages corresponding to uplink transmitting beams.

Embodiment 4

It is supposed that a base station receives uplink access signals by utilizing N uplink receiving beams, and an area required to be covered by the base station may substantially be covered by utilizing the N uplink receiving beam groups. The base station and a terminal predefine that $X*Y=N$ sequence time-domain resource sets formed by X uplink access signal sequence sets and Y uplink access beam time-domain resource sets correspond to the N uplink receiving beam beams, wherein $X>1$ and $Y>1$.

In an alternative way, the base station notifies the terminal of a corresponding relationship between the N sequence time-domain resource sets and the N uplink receiving beam groups through a broadcast and/or high-layer signaling.

The base station divides uplink receiving beams into nG groups, $nG>1$, each group includes at least one receiving beam, intra-group simultaneous reception and inter-group time division reception are adopted, and the predefined uplink access signal sequence sets are received in the groups. The terminal regulates uplink access signal sequence and uplink access signal sending time combinations to send uplink access signals to cover different uplink receiving beam and transmitting beam combinations.

If the terminal obtains a corresponding relationship between the N sequence time-domain resource sets and N downlink beam indexes respectively through a system message, the terminal is required to receive the system message at first to obtain the corresponding relationship. The terminal sends the uplink access signals by utilizing the uplink receiving beam groups corresponding to the N sequence time-domain resource sets to ensure that each uplink receiving beam of the base station may receive an uplink access signal. The base station and the terminal recognize different uplink receiving beam indexes through the uplink access signal sequence time-domain resource sets, wherein each uplink access signal sequence time-domain resource set includes at least one uplink access signal sequence and a time-domain resource set.

For example, an uplink access signal sequence time-domain resource set 0 includes: an uplink access signal sequence set 0 and an uplink access signal sending time-domain resource set 0, and an uplink access signal sequence time-domain resource set 1 includes: an uplink access signal sequence set 1 and an uplink access signal sending time-domain resource set 1.

Or, the uplink access signal sequence time-domain resource set 0 includes: the uplink access signal sequence set 0 and the uplink access signal sending time-domain resource set 0, and the uplink access signal sequence time-domain resource set 1 includes: the uplink access signal sequence set 0 and the uplink access signal sending time-domain resource set 1.

Or, the uplink access signal sequence time-domain resource set 0 includes: the uplink access signal sequence set 0 and the uplink access signal sending time-domain resource set 0, and the uplink access signal sequence time-domain resource set 1 includes: the uplink access signal sequence set 1 and the uplink access signal sending time-domain resource set 0, etc.

Example 1

The base station receives the uplink access signals sent by the terminal by utilizing 8 uplink receiving beam groups, and the base station may substantially cover the area required to be covered by the base station by utilizing the 8 uplink receiving beam groups. The base station and the terminal predefine that 8 uplink access signal sequence time-domain resource sets correspond to the 8 uplink receiving beam group indexes respectively, or the base station notifies the terminal of a corresponding relationship between the 8 uplink access signal sequence time-domain resource sets and the 8 uplink receiving beam groups respectively through a broadcast and/or high-layer signaling, as shown in Table 12.

TABLE 12

| Uplink receiving beam group | Uplink access signal sequence time-domain resource set for sending uplink access signals |
|---|---|
| 0 | Uplink access signal sequence time-domain resource set 0 |
| 1 | Uplink access signal sequence time-domain resource set 1 |
| 2 | Uplink access signal sequence time-domain resource set 2 |
| 3 | Uplink access signal sequence time-domain resource set 3 |
| 4 | Uplink access signal sequence time-domain resource set 4 |
| 5 | Uplink access signal sequence time-domain resource set 5 |
| 6 | Uplink access signal sequence time-domain resource set 6 |
| 7 | Uplink access signal sequence time-domain resource set 7 |

The terminal detects downlink signals and receives the broadcast and/or high-layer signaling of the base station to recognize uplink access signal sequence time-domain resource set information, and at this moment, the terminal selects one or more sequences of the sequence time-domain resource sets corresponding to different uplink receiving beam groups to send the uplink access signals.

The base station receives the uplink access signals on the uplink receiving beam groups, the base station detects that the sequences configured for the uplink access signals are the sequences in the uplink access signal sequence set 6, and the base station sends uplink access response messages corresponding to the frequency-domain resource set 6 to recognize an uplink receiving beam meeting uplink transmission. The base station may subsequently receive uplink data transmitted by the terminal by adopting the uplink receiving beam.

The terminal confirms an uplink transmitting beam meeting uplink transmission according to uplink transmitting beams corresponding to the received uplink access response messages corresponding to the uplink transmitting beams.

Example 2

It is supposed that the base station receives the uplink access signals sent by the terminal by utilizing 10 uplink receiving beam groups, and the base station may substantially cover the area required to be covered by the base station by utilizing the 10 uplink receiving beam groups. The base station and the terminal predefine that 10 uplink access signal sequence time-domain resource sets correspond to the 10 uplink receiving beam groups respectively, or the base station notifies the terminal of a corresponding relationship between the 10 uplink access signal sequence time-domain resource sets and the 10 uplink beam groups respectively through a broadcast and/or high-layer signaling, as shown in Table 13.

TABLE 13

| Uplink receiving beam group | Uplink access signal sequence time-domain resource set for sending uplink access signals |
|---|---|
| 0 | Uplink access signal sequence time-domain resource set 0 |
| 1 | Uplink access signal sequence time-domain resource set 1 |
| 2 | Uplink access signal sequence time-domain resource set 2 |
| 3 | Uplink access signal sequence time-domain resource set 3 |
| 4 | Uplink access signal sequence time-domain resource set 4 |
| 5 | Uplink access signal sequence time-domain resource set 5 |
| 6 | Uplink access signal sequence time-domain resource set 6 |
| 7 | Uplink access signal sequence time-domain resource set 7 |
| 8 | Uplink access signal sequence time-domain resource set 8 |
| 9 | Uplink access signal sequence time-domain resource set 9 |

The terminal detects downlink signals and receives the broadcast and/or high-layer signaling of the base station to recognize uplink access signal sequence time-domain resource set information, and at this moment, the terminal selects one or more sequences in the sequence sets corresponding to different uplink receiving beam groups to send the uplink access signals.

The base station receives the uplink access signals on the uplink receiving beam groups, the base station detects that the sequences configured for the uplink access signals are the sequences in the uplink access signal sequence set 6, and the base station sends uplink access response messages corresponding to the frequency-domain resource set 6 to recognize an uplink receiving beam meeting uplink transmission. The base station may subsequently receive uplink data transmitted by the terminal by adopting the uplink receiving beam.

The terminal confirms an uplink transmitting beam meeting uplink transmission according to the received uplink access response messages corresponding to uplink transmitting beams.

If multiple uplink access channels sent by the same terminal receive the uplink access response signals, an uplink beam corresponding to an uplink access response signal with high quality is selected as an optimal uplink transmitting beam according to uplink access signal quality fields. The response messages include uplink access signal PQIs, wherein an indicator bit number is nPQI=2, and indicated quality conditions are arranged from low to high according to Table 14 as follows.

TABLE 14

| [b1 b0] | Priority |
|---|---|
| 0 0 | 0 |
| 0 1 | 1 |
| 1 0 | 2 |
| 1 1 | 3 |

The terminal receives response messages, recorded as RAR_txBeam0 and RAR_txBeam2 respectively, of uplink access signals sent by an uplink transmitting beam index 0 and an uplink beam index 2, and PQI fields of RAR_txBeam0 and RAR_txBeam2 are [0 0] and [1 0] respectively. The terminal selects a beam with the uplink transmitting beam index 2 from multiple uplink access responses as an optimal uplink transmitting beam.

Embodiment 5

It is supposed that a base station receives uplink access signals by utilizing N uplink receiving beam groups, and an area required to be covered by the base station may substantially be covered by utilizing the N uplink receiving beam groups. The base station and a terminal predefine that X*Y=N sequence frequency-domain resource sets formed by X uplink access signal sequence sets and Y uplink access signal frequency-domain resource sets correspond to the N uplink receiving beam beams, wherein X>1 and Y>1.

Or, the base station notifies the terminal of a corresponding relationship between the N sequence frequency-domain resource sets and the N uplink receiving beam groups through a broadcast and/or high-layer signaling. The base station notifies the terminal through the broadcast, or another base station which has established a connection with the same terminal within the same coverage notifies the terminal through the high-layer signaling.

If the terminal obtains the corresponding relationship between the N sequence frequency-domain resource sets and the N uplink receiving beam groups through the broadcast and/or the high-layer signaling, the terminal is required to receive the broadcast and/or the high-layer signaling at first to obtain the corresponding relationship. The base station and the terminal recognize different uplink receiving beam indexes through the uplink access signal sequence frequency-domain resource sets. The terminal sends the uplink access signals by utilizing the uplink receiving beam groups corresponding to the N sequence frequency-domain resource sets to ensure that each uplink receiving beam group of the base station is covered, wherein each uplink access signal sequence frequency-domain resource set includes at least one uplink access signal sequence and a frequency-domain resource set.

For example, an uplink access signal sequence frequency-domain resource set 0 includes: an uplink access signal sequence set 0 and an uplink access signal sending frequency-domain resource set 0, and an uplink access signal sequence frequency-domain resource set 1 includes: an uplink access signal sequence set 1 and an uplink access signal sending frequency-domain resource set 1.

Or, the uplink access signal sequence frequency-domain resource set 0 includes: the uplink access signal sequence set 0 and the uplink access signal sending frequency-domain resource set 0, and the uplink access signal sequence frequency-domain resource set 1 includes: the uplink access signal sequence set 0 and the uplink access signal sending frequency-domain resource set 1.

Or, the uplink access signal sequence frequency-domain resource set 0 includes: the uplink access signal sequence set 0 and the uplink access signal sending frequency-domain resource set 0, and the uplink access signal sequence frequency-domain resource set 1 includes: the uplink access signal sequence set 1 and the uplink access signal sending frequency-domain resource set 0, etc.

Example 1

The base station receives the uplink access signals by utilizing 8 uplink receiving beam groups, and the base station may substantially cover the uplink receiving area required to be covered by the base station by utilizing the 8 uplink receiving beam groups. The base station and the terminal predefine that 8 uplink access signal sequence frequency-domain resource sets correspond to the 8 uplink receiving beam groups respectively, or the base station notifies the terminal of a corresponding relationship between the 8 uplink access signal sequence frequency-domain resource sets and the 8 uplink receiving beam groups respectively through a broadcast and/or high-layer signaling, as shown in Table 15.

TABLE 15

| Uplink receiving beam group | Uplink access signal sequence frequency-domain resource set for sending uplink access signals |
|---|---|
| 0 | Uplink access signal sequence frequency-domain resource set 0 |
| 1 | Uplink access signal sequence frequency-domain resource set 1 |
| 2 | Uplink access signal sequence frequency-domain resource set 2 |
| 3 | Uplink access signal sequence frequency-domain resource set 3 |
| 4 | Uplink access signal sequence frequency-domain resource set 4 |
| 5 | Uplink access signal sequence frequency-domain resource set 5 |
| 6 | Uplink access signal sequence frequency-domain resource set 6 |
| 7 | Uplink access signal sequence frequency-domain resource set 7 |

The terminal detects downlink signals and receives the broadcast and/or high-layer signaling of the base station to recognize uplink access signal sequence frequency-domain resource set information, and at this moment, the terminal selects one or more sequences of the sequence sets corresponding to different uplink receiving beam groups to send the uplink access signals.

The corresponding relationship between the uplink receiving beam groups and the uplink access signal sequence frequency-domain resource sets may be notified to the terminal by the local base station through the broadcast and/or the high-layer signaling, and may also be notified to the terminal by another base station which has established a connection with the terminal through the high-layer signaling.

The base station receives uplink access signals of one or more in the uplink access signal sequence frequency-domain resource set 6 selected by the terminal.

The base station detects the uplink access signal sequence frequency-domain resource set on the uplink receiving beam group 6, and after the base station detects the uplink access signals, the base station sends uplink access response messages to the terminal.

The terminal confirms an uplink transmitting beam meeting uplink transmission according to uplink transmitting beams corresponding to the received uplink access response messages corresponding to the uplink transmitting beams.

Example 2

It is supposed that the base station receives the uplink access signals by utilizing 8 uplink receiving beam groups, and the base station may substantially cover the uplink receiving area required to be covered by the base station by utilizing the 8 uplink receiving beam groups.

The base station and the terminal predefine that 8 uplink access signal sequence frequency-domain resource sets correspond to the 8 uplink receiving beam groups, or the base station notifies the terminal of a corresponding relationship between 10 uplink access signal sequence frequency-domain resource sets and 10 uplink beam groups through a broadcast and/or high-layer signaling, as shown in Table 16.

TABLE 16

| Uplink receiving beam group | Uplink access signal sequence frequency-domain resource set for sending uplink access signals |
|---|---|
| 0 | Uplink access signal sequence frequency-domain resource set 0 |
| 1 | Uplink access signal sequence frequency-domain resource set 1 |
| 2 | Uplink access signal sequence frequency-domain resource set 2 |
| 3 | Uplink access signal sequence frequency-domain resource set 3 |
| 4 | Uplink access signal sequence frequency-domain resource set 4 |
| 5 | Uplink access signal sequence frequency-domain resource set 5 |
| 6 | Uplink access signal sequence frequency-domain resource set 6 |
| 7 | Uplink access signal sequence frequency-domain resource set 7 |
| 8 | Uplink access signal sequence frequency-domain resource set 8 |
| 9 | Uplink access signal sequence frequency-domain resource set 9 |

The terminal detects downlink signals and receives the broadcast and/or high-layer signaling of the base station to recognize uplink access signal sequence frequency-domain resource set information, and the terminal selects one or more sequences in the sequence sets corresponding to different uplink receiving beam groups to send the uplink access signals.

The corresponding relationship between the uplink receiving beam groups and the uplink access signal sequence frequency-domain resource sets may be notified to the terminal by the local base station through the broadcast and/or the high-layer signaling, and may also be notified to the terminal by another base station which has established a connection with the terminal through the high-layer signaling.

The base station receives uplink access signals of one or more in the uplink access signal sequence frequency-domain resource set 6 selected by the terminal. The base station sends uplink access response messages to the terminal after detecting the uplink access signals. The response messages include uplink access signal PQIs, wherein an indicator bit number is nPQI=2, and indicated quality conditions are arranged from low to high according to Table 17 as follows.

TABLE 17

| [b1 b0] | Priority |
|---|---|
| 0 0 | 3 |
| 0 1 | 2 |
| 1 0 | 1 |
| 1 1 | 0 |

The terminal receives response messages, recorded as RAR_txBeam0 and RAR_txBeam2 respectively, sent by an uplink beam index 0 and an uplink beam index 2, and PQI fields of RAR_txBeam0 and RAR_txBeam2 are [0 0] and [1 0] respectively. The terminal selects a beam with the uplink beam index 0 therein as an optimal uplink transmitting beam.

Embodiment 6

It is supposed that a base station receives uplink access signals by utilizing N uplink receiving beams, and an area required to be covered by the base station may substantially be covered by utilizing the N uplink receiving beam groups. The base station and a terminal predefine that X*Y=N time-domain and frequency-domain joint locations formed by X uplink access signal sequence time-domain resource sets and Y uplink access beam frequency-domain resource sets correspond to the N uplink receiving beam beams respectively.

In an alternative way, the base station notifies the terminal of a corresponding relationship between N sequence time-domain and frequency-domain resource sets and the N uplink receiving beam groups through a broadcast and/or high-layer signaling. The corresponding relationship may be notified to the terminal by the local base station through the broadcast and/or the high-layer signaling, or is notified to the terminal by another base station which has established a connection with the terminal within the same coverage through high-layer signaling.

Figure 4:
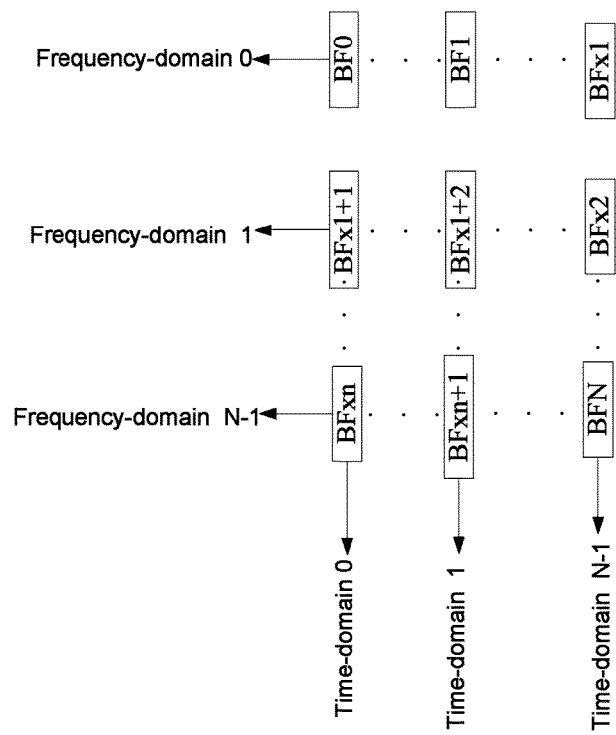
FIG. 4 is a schematic diagram of jointly indicating beam indexes by utilizing time-domain and frequency-domain resource sets according to an embodiment of the present disclosure.

If the terminal obtains the corresponding relationship between the N time-domain and frequency-domain resource sets and the N uplink receiving beam groups through the broadcast and/or the high-layer signaling, the terminal is required to receive the broadcast and/or the high-layer signaling at first to obtain the corresponding relationship. The base station and the terminal recognize different uplink receiving beam groups through the uplink access signal time-domain and frequency-domain resource sets. The terminal sends the uplink access signals by utilizing the uplink receiving beam groups corresponding to the N time-domain and frequency-domain resource sets to ensure that each uplink receiving beam group of the base station is covered, wherein each uplink access signal sequence frequency-domain resource set includes at least one time-domain resource set and a frequency-domain resource set. For example, as shown in FIG. 4, BFn is an uplink receiving beam index. Here, no limits are made to uplink access signal sequences configured to the terminal by the base station, and the base station and the terminal recognize different uplink receiving beam groups through the uplink access signal time-domain and frequency-domain resource sets.

For example, an uplink access signal sequence time-domain and frequency-domain joint location 0 includes: an uplink access signal sending time-domain resource set 0 and an uplink access signal sending frequency-domain resource set 0, and an uplink access signal sequence frequency-domain resource set 1 includes: an uplink access signal sending time-domain resource set 1 and an uplink access signal sending frequency-domain resource set 1.

Or, an uplink access signal sequence frequency-domain resource set 0 includes: the uplink access signal sending time-domain resource set 0 and the uplink access signal sending frequency-domain resource set 0, and the uplink access signal sequence frequency-domain resource set 1 includes: the uplink access signal sending time-domain resource set 0 and the uplink access signal sending frequency-domain resource set 1.

Or, the uplink access signal sequence frequency-domain resource set 0 includes: the uplink access signal sending time-domain resource set 0 and the uplink access signal sending frequency-domain resource set 0, and the uplink access signal sequence frequency-domain resource set 1 includes: the uplink access signal sending time-domain resource set 1 and the uplink access signal sending frequency-domain resource set 0, etc.

Example 1

It is supposed that the base station receives the uplink access signals by utilizing 8 uplink receiving beam groups, and the base station may substantially cover the uplink receiving area required to be covered by the base station by utilizing the 8 uplink receiving beam groups. The base station and the terminal predefine that 8 uplink access signal time-domain and frequency-domain joint locations correspond to the 8 uplink receiving beam groups respectively, or the base station notifies the terminal of a corresponding relationship between 8 uplink access signal time-domain and frequency-domain resource sets and the 8 uplink receiving beam groups through a broadcast and/or high-layer signaling, as shown in Table 18.

TABLE 18

| Uplink receiving beam index | Uplink access signal time-domain and frequency-domain joint location for sending uplink access signals |
|---|---|
| 0 | Uplink access signal time-domain and frequency-domain resource set 0 |
| 1 | Uplink access signal time-domain and frequency-domain resource set 1 |
| 2 | Uplink access signal time-domain and frequency-domain resource set 2 |
| 3 | Uplink access signal time-domain and frequency-domain resource set 3 |
| 4 | Uplink access signal time-domain and frequency-domain resource set 4 |
| 5 | Uplink access signal time-domain and frequency-domain resource set 5 |
| 6 | Uplink access signal time-domain and frequency-domain resource set 6 |
| 7 | Uplink access signal time-domain and frequency-domain resource set 7 |

The terminal detects downlink signals and receives the broadcast and/or high-layer signaling of the base station to recognize uplink access signal time-domain and frequency-domain resource set information, and at this moment, the terminal selects one or more sequences in sequence sets corresponding to different uplink receiving beam groups to send the uplink access signals.

The corresponding relationship between the uplink receiving beam groups and the uplink access signal time-domain and frequency-domain resource sets may be notified to the terminal by the base station through the broadcast and/or the high-layer signaling, and may also be notified to the terminal by another base station which has established a connection with the terminal through high-layer signaling.

The base station receives uplink access signals of one or more in the uplink access signal time-domain and frequency-domain resource set 6 selected by the terminal.

The base station detects the uplink access signal time-domain and frequency-domain resource set on the uplink receiving beam group 6, and after the base station detects the uplink access signals, the base station sends uplink access response messages to the terminal.

The terminal confirms an uplink transmitting beam meeting uplink transmission according to uplink transmitting beams corresponding to the received uplink access response messages corresponding to the uplink transmitting beams.

Example 2

It is supposed that the base station receives the uplink access signals by utilizing 10 uplink receiving beam groups, and the base station may substantially cover the uplink receiving area required to be covered by the base station by utilizing the 10 uplink receiving beam groups. The base station and the terminal predefine that 10 uplink access signal time-domain and frequency-domain resource sets correspond to 10 uplink receiving beam indexes, or the base station notifies the terminal of a corresponding relationship between the 10 uplink access signal time-domain and frequency-domain resource sets and the 10 uplink receiving beam indexes through a system message, as shown in Table 19.

TABLE 19

| Uplink receiving beam group | Uplink access signal time-domain and frequency-domain resource set for sending uplink access signals |
|---|---|
| 0 | Uplink access signal time-domain and frequency-domain resource set 0 |
| 1 | Uplink access signal time-domain and frequency-domain resource set 1 |
| 2 | Uplink access signal time-domain and frequency-domain resource set 2 |
| 3 | Uplink access signal time-domain and frequency-domain resource set 3 |
| 4 | Uplink access signal time-domain and frequency-domain resource set 4 |
| 5 | Uplink access signal time-domain and frequency-domain resource set 5 |
| 6 | Uplink access signal time-domain and frequency-domain resource set 6 |
| 7 | Uplink access signal time-domain and frequency-domain resource set 7 |

TABLE 19-continued

| Uplink receiving beam group | Uplink access signal time-domain and frequency-domain resource set for sending uplink access signals |
|---|---|
| 8 | Uplink access signal time-domain and frequency-domain resource set 8 |
| 9 | Uplink access signal time-domain and frequency-domain resource set 9 |

The terminal detects downlink signals and receives a broadcast and/or high-layer signaling of the base station to recognize uplink access signal time-domain and frequency-domain resource set information, and at this moment, the terminal selects one or more sequences in sequence sets corresponding to different uplink receiving beam groups to send the uplink access signals.

The corresponding relationship between the uplink receiving beam groups and the uplink access signal time-domain and frequency-domain resource sets may be notified to the terminal by the local base station through the broadcast and/or the high-layer signaling, and may also be notified to the terminal by another base station which has established a connection with the terminal through the high-layer signaling.

The terminal divides uplink transmitting beams according to own beam capability, different uplink transmitting beams in different groups are distinguished in a time division manner, and different uplink transmitting beams in the same groups are distinguished in a code division manner. The terminal determines group indexes of the uplink transmitting beams according to time division, and determines inter-group indexes of the uplink transmitting beams according to code division, and the terminal may determine unique uplink transmitting beam indexes according to the group indexes and the intra-group indexes. After transmitting uplink access signals from a group index idxG and an intra-group index idxInG, the terminal may receive uplink access response messages corresponding to idxG and idxInG.

The base station receives uplink access signals of one or more in the uplink access signal time-domain and frequency-domain resource set 6 selected by the terminal.

The base station detects the uplink access signals of the time-domain and frequency-domain resource set on the uplink receiving beam group 6, and the base station sends uplink access response messages to the terminal after detecting the uplink access signals.

Figure 6:
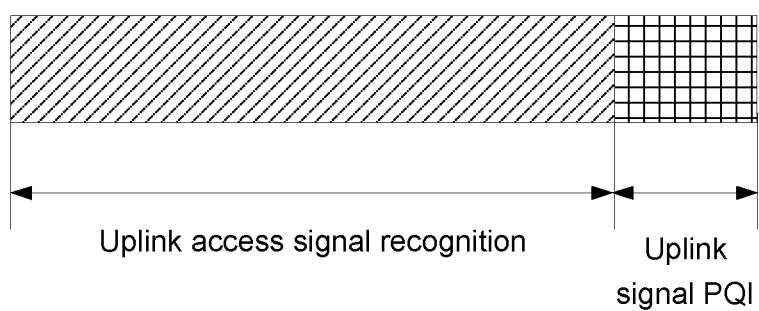
FIG. 6 is a schematic diagram of indicating quality of uplink access signals by utilizing additional area indication information of uplink access response signals according to an embodiment of the present disclosure.

As shown in FIG. 6, the response messages include uplink access signal recognition information and uplink access signal PQIs. The uplink access signal recognition information includes time resource sets corresponding to the uplink access signals and frequency-domain resource sets corresponding to the uplink access signals.

The time resource sets corresponding to the uplink access signals include at least one of: timing relationships between uplink access times and uplink access responses, for example: if a sending time of an uplink access signal is tTx, a corresponding uplink access response message is sent at tTx+n, wherein n is a timing time unit for uplink access sending and responding, and n>0;

certain delay timing relationships between the uplink access times and the uplink access responses, for example: if a sending time of an uplink access signal is tTx, the base station sends a corresponding uplink access response message at tTx+n~tTx+n+tWindow, wherein n is a timing time for uplink access sending and responding, tWindow is a time window for uplink access responding, tWindow>0, and the base station may respond to the uplink access signal within this time window; and certain timing relationships between uplink access durations and the uplink access responses, for example: if a sending time of an uplink access signal is tTx and a duration is tDura, the base station responds to the uplink access signal at a time tTx+n+k*tDura, wherein n is a timing time for uplink access sending and responding, k is an access sequence duration-based time offset granularity, and k>0.

The frequency-domain resource sets corresponding to the uplink access signals include at least one of:

corresponding relationships between frequency-domain locations of the uplink access signals and frequency-domain locations of the uplink access responses, for example: if sending frequency-domain resources of the access uplink signals are fReLow~fReHigh, the corresponding uplink access response messages are sent within a frequency-domain range of fReLow−Δ1~fReHigh+Δ2, wherein fReLow is a minimum index of a frequency domain where the uplink access signals are located, fReHigh is a maximum index of the frequency domain where the uplink access signals are located, Δ1 and Δ2 are frequency-domain offset units for uplink access sending and responding, Δ1>0 and Δ2>0;

corresponding relationships between the frequency-domain locations of the uplink access signals and the frequency-domain locations of the uplink access responses, for example: if the sending frequency-domain resources of the access uplink signals are fReLow~fReHigh, the uplink access responses are transmitted within a system bandwidth in a frequency hopping manner, for example, the frequency-domain locations of the responses of the first half are within fMin+fReLow+Δ1~fMin+fReLow+lenAll/2+Δ1, and the frequency-domain locations of the responses of the latter half are within fMax−fRe−+lenAll/2−Δ2~fMax−fRe−Δ2, wherein lenAll is a bandwidth occupied by the uplink access signals; or an implicit receiving scrambling code seqRX=a*tTx+b*fReLow is determined according to the time and frequency-domain resources for the uplink access signals, wherein a>0 and b>0.

Bits of the uplink access signal PQIs are implicitly included in data bits of the uplink access responses, wherein an indicator bit number is nPQI=2, indicated quality conditions and corresponding scrambling codes are shown in Table 20, and in Table 20, if numerical values in a priority column are higher, it is indicated that quality of the uplink access signals is higher.

TABLE 20

| [b1 b0] | Priority | Scrambling code |
|---|---|---|
| 0 0 | 3 | [0 0 0 0 . . . ] |
| 0 1 | 2 | [1 0 1 0 . . . ] |
| 1 0 | 1 | [0 1 0 1 . . . ] |
| 1 1 | 0 | [1 1 1 1 . . . ] |

The terminal receives response messages, recorded as RAR_txBeam0 and RAR_txBeam2 respectively, of uplink access sent by an uplink transmitting beam with a group index 0 and an intra-group index 0 and an uplink transmitting beam with a group index 2 and an intra-group index 2, and RAR_txBeam0 and RAR_txBeam2 are descrambled and correctly demodulated according to scrambling codes corresponding to PQI fields [0 0] and [1 0] respectively. The terminal selects the beam with the uplink beam group index 0 and the intra-group index 0 therein as an optimal uplink transmitting beam.

Embodiment 7

It is supposed that a base station receives uplink access signals by utilizing N uplink receiving beams, and the base station may substantially cover an area required to be covered by the base station by utilizing the N uplink receiving beam groups. The base station and a terminal predefine that X*Y*S=N sequence, time-domain and frequency-domain resource sets formed by X uplink access signal time-domain resource sets, Y uplink access beam frequency-domain resource sets and S uplink access signal sequence sets correspond to the N uplink receiving beam beams respectively.

In an alternative way, the base station notifies the terminal of a corresponding relationship between the N sequence, time-domain and frequency-domain resource sets and the N uplink receiving beam groups through a broadcast and/or high-layer signaling. The corresponding relationship may be notified to the terminal by the local base station through the broadcast and/or the high-layer signaling, or is notified to the terminal by another base station which has established a connection with the terminal within the same coverage through high-layer signaling.

If the terminal obtains the corresponding relationship between the N sequence, time-domain and frequency-domain resource sets and the N uplink receiving beam groups through the broadcast and/or the high-layer signaling, the terminal is required to receive the broadcast and/or the high-layer signaling at first to obtain the corresponding relationship. The base station and the terminal cover different uplink receiving beam groups of the base station through the uplink access signal sequence, time-domain and frequency-domain resource sets. The terminal sends the uplink access signals by utilizing the uplink receiving beam groups corresponding to the N time-domain and frequency-domain resource sets to cover each uplink receiving beam group of the base station, for example, as shown in FIG. 5, wherein each uplink access signal sequence, time-domain and frequency-domain resource set includes at least one sequence set, a time-domain resource set and a frequency-domain resource set.

For example, an uplink access signal sequence, time-domain and frequency-domain set 0 includes: sequences in an uplink access signal set 0 for uplink access signals, an uplink access signal sending time-domain resource set 0 and an uplink access signal sending frequency-domain resource set 0, and an uplink access signal sequence frequency-domain resource set 1 includes: sequences in an uplink access signal set 1 for uplink access signals, an uplink access signal sending time-domain resource set 1 and an uplink access signal sending frequency-domain resource set 1.

Or, an uplink access signal sequence frequency-domain set 0 includes: the sequences in the uplink access signal set 0 for the uplink access signals, the uplink access signal sending time-domain resource set 0 and the uplink access signal sending frequency-domain resource set 0, and the uplink access signal sequence frequency-domain resource set 1 includes: the sequences in the uplink access signal set 0 for the uplink access signals, the uplink access signal sending time-domain resource set 0 and the uplink access signal sending frequency-domain resource set 1.

Or, the uplink access signal sequence frequency-domain set 0 includes: the sequences in the uplink access signal set 0 for the uplink access signals, the uplink access signal sending time-domain resource set 0 and the uplink access signal sending frequency-domain resource set 0, and the uplink access signal sequence frequency-domain resource set 1 includes: the sequences in the uplink access signal set 0 for the uplink access signals, the uplink access signal sending time-domain resource set 1 and the uplink access signal sending frequency-domain resource set 0.

Or, the uplink access signal sequence frequency-domain set 0 includes: the sequences in the uplink access signal set 0 for the uplink access signals, the uplink access signal sending time-domain resource set 0 and the uplink access signal sending frequency-domain resource set 0, and the uplink access signal sequence frequency-domain resource set 1 includes: the sequences in the uplink access signal set 0 for the uplink access signals, the uplink access signal sending time-domain resource set 1 and the uplink access signal sending frequency-domain resource set 1.

Or, the uplink access signal sequence frequency-domain set 0 includes: the sequences in the uplink access signal set 0 for the uplink access signals, the uplink access signal sending time-domain resource set 0 and the uplink access signal sending frequency-domain resource set 0, and the uplink access signal sequence frequency-domain resource set 1 includes: the sequences in the uplink access signal set 1 for the uplink access signals, the uplink access signal sending time-domain resource set 0 and the uplink access signal sending frequency-domain resource set 0.

Or, the uplink access signal sequence frequency-domain set 0 includes: the sequences in the uplink access signal set 0 for the uplink access signals, the uplink access signal sending time-domain resource set 0 and the uplink access signal sending frequency-domain resource set 0, and the uplink access signal sequence frequency-domain resource set 1 includes: the sequences in the uplink access signal set 1 for the uplink access signals, the uplink access signal sending time-domain resource set 0 and the uplink access signal sending frequency-domain resource set 1.

Or, the uplink access signal sequence frequency-domain set 0 includes: the sequences in the uplink access signal set 0 for the uplink access signals, the uplink access signal sending time-domain resource set 0 and the uplink access signal sending frequency-domain resource set 0, and the uplink access signal sequence frequency-domain resource set 1 includes: the sequences in the uplink access signal set 1 for the uplink access signals, the uplink access signal sending time-domain resource set 1 and the uplink access signal sending frequency-domain resource set 0.

Or, the uplink access signal sequence frequency-domain set 0 includes: the sequences in the uplink access signal set 0 for the uplink access signals, the uplink access signal sending time-domain resource set 0 and the uplink access signal sending frequency-domain resource set 0, and the uplink access signal sequence frequency-domain resource set 1 includes: the sequences in the uplink access signal set 1 for the uplink access signals, the uplink access signal sending time-domain resource set 1 and the uplink access signal sending frequency-domain resource set 1.

Example 1

It is supposed that the base station receives the uplink access signals by utilizing 8 uplink receiving beam groups, and the base station may substantially cover the uplink receiving area required to be covered by the base station by utilizing the 8 uplink receiving beam groups. The base station and the terminal predefine that 8 uplink access signal sequence, time-domain and frequency-domain resource sets correspond to the 8 uplink receiving beam groups, In an alternative way, the base station notifies the terminal of a corresponding relationship between the 8 uplink access signal sequence, time-domain and frequency-domain resource sets and the 8 uplink receiving beam groups through a broadcast and/or high-layer signaling, as shown in Table 21.

TABLE 21

| Uplink receiving beam group | Sequence, time-domain and frequency-domain resource set |
|---|---|
| 0 | Sequence, time-domain and frequency-domain resource set 0 |
| 1 | Sequence, time-domain and frequency-domain resource set 1 |
| 2 | Sequence, time-domain and frequency-domain resource set 2 |
| 3 | Sequence, time-domain and frequency-domain resource set 3 |
| 4 | Sequence, time-domain and frequency-domain resource set 4 |
| 5 | Sequence, time-domain and frequency-domain resource set 5 |
| 6 | Sequence, time-domain and frequency-domain resource set 6 |
| 7 | Sequence, time-domain and frequency-domain resource set 7 |

The terminal detects downlink signals and receives the broadcast and/or high-layer signaling of the base station to recognize uplink access signal sequence, time-domain and frequency-domain resource set information, and at this moment, the terminal selects one or more of the sequence, time-domain and frequency-domain resource sets corresponding to different uplink receiving beam groups to send the uplink access signals. The terminal groups uplink transmitting beams according to own beam capability, different uplink transmitting beams in different groups are distinguished in a time division manner, and different uplink transmitting beams in the same groups are distinguished in a code division manner.

The corresponding relationship between the uplink receiving beam groups and the uplink access signal sequence, time-domain and frequency-domain resource sets may be notified to the terminal by the base station through the broadcast and/or the high-layer signaling, and may also be notified to the terminal by another base station which has established a connection with the terminal through high-layer signaling.

The base station receives uplink access signals sent by a combination of the one or more uplink access signal sequence, time-domain and frequency-domain resource sets in the uplink access signal sequence, time-domain and frequency-domain resource set 6 selected by the terminal.

The base station detects the uplink access signal sequence, time-domain and frequency-domain resource set on the uplink receiving beam group 6, and the base station sends uplink access response messages to the terminal after detecting the uplink access signals.

The terminal confirms an uplink transmitting beam meeting uplink transmission according to uplink transmitting beams corresponding to the received uplink access response messages corresponding to the uplink transmitting beams.

Example 2

It is supposed that the base station receives the uplink access signals by utilizing 8 uplink receiving beam groups, and the base station may substantially cover the uplink receiving area required to be covered by the base station by utilizing the 8 uplink receiving beam groups. The base station and the terminal predefine uplink access signal sequence, time-domain and frequency-domain resource sets corresponding to 8 downlink transmitting beam groups. The base station and the terminal predefine that 8 uplink access signal sequence, time-domain and frequency-domain resource sets correspond to the 8 uplink receiving beam groups respectively, In an alternative way, the base station notifies the terminal of a corresponding relationship between 8 uplink access signal sequence, time-domain and frequency-domain joint locations and 8 uplink receiving beam indexes respectively through a system message, as shown in Table 22.

TABLE 22

| Uplink receiving beam group | Sequence, time-domain and frequency-domain joint resource set |
|---|---|
| 0 | Sequence, time-domain and frequency-domain joint resource set 0 |
| 1 | Sequence, time-domain and frequency-domain joint resource set 1 |
| 2 | Sequence, time-domain and frequency-domain joint resource set 2 |
| 3 | Sequence, time-domain and frequency-domain joint resource set 3 |
| 4 | Sequence, time-domain and frequency-domain joint resource set 4 |
| 5 | Sequence, time-domain and frequency-domain joint resource set 5 |
| 6 | Sequence, time-domain and frequency-domain joint resource set 6 |
| 7 | Sequence, time-domain and frequency-domain joint resource set 7 |

The terminal detects downlink signals and receives a broadcast and/or high-layer signaling of the base station to recognize uplink access signal time-domain and frequency-domain resource set information, and at this moment, the terminal selects one or more sequences in sequence sets corresponding to different uplink receiving beam groups to send the uplink access signals. The terminal groups uplink transmitting beams according to own beam capability, different uplink transmitting beams in different groups are distinguished in a time division manner, and different uplink transmitting beams in the same groups are distinguished in a code division manner.

The corresponding relationship between the uplink receiving beam groups and the uplink access signal time-domain and frequency-domain resource sets may be notified to the terminal by the base station through the broadcast and/or the high-layer signaling, and may also be notified to the terminal by another base station which has established a connection with the terminal through high-layer signaling.

The base station receives uplink access signals sent one or more in the uplink access signal time-domain and frequency-domain resource set 6 selected by the terminal.

The base station detects the uplink access signals of the time-domain and frequency-domain resource set on the uplink receiving beam group 6, and after the base station detects the uplink access signals, the base station sends uplink access response messages to the terminal.

The response messages include uplink access signal PQIs, and bits of the uplink access signal PQIs are implicitly included in data bits of uplink access responses, wherein an indicator bit number is nPQI=2, indicated quality conditions and corresponding scrambling codes are shown in Table 23, and in Table 23, if numerical values in a priority column are higher, it is indicated that quality of the uplink access signals is higher.

TABLE 23

| [b1 b0] | Priority | Scrambling code |
|---|---|---|
| 0 0 | 3 | [0 0 0 0 . . . ] |
| 0 1 | 2 | [1 0 1 0 . . . ] |
| 1 0 | 1 | [0 1 0 1 . . . ] |
| 1 1 | 0 | [1 1 1 1 . . . ] |

The terminal receives response messages, recorded as RAR_txBeam0 and RAR_txBeam2 respectively, of uplink access sent by an uplink transmitting beam with a group index 0 and an intra-group index 0 and an uplink transmitting beam with a group index 2 and an intra-group index 2, and RAR_txBeam0 and RAR_txBeam2 are descrambled and correctly demodulated according to scrambling codes corresponding to PQI fields [0 0] and [1 0] respectively. The terminal selects the beam with the uplink beam group index 0 and the intra-group index 0 therein as an optimal uplink transmitting beam.

Example 3

It is supposed that a base station 1 receives access signals by utilizing 8 receiving beam groups, and the base station 1 may substantially cover a receiving area required to be covered by the base station by utilizing the 8 receiving beam groups. The base station 1 and a base station 2 predefine access signal sequence, time-domain and frequency-domain resource sets corresponding to the 8 transmitting beam groups. The base station 1 and the base station 2 predefine that 8 access signal sequence, time-domain and frequency-domain resource sets correspond to the 8 receiving beam groups respectively, In an alternative way, the base station 1 and the base station 2 learn about a corresponding relationship between the 8 uplink access signal sequence, time-domain and frequency-domain joint sets and the 8 uplink receiving beam groups respectively by backhaul signaling interaction, as shown in Table 24.

TABLE 24

| Receiving beam group | Sequence, time-domain and frequency-domain joint set |
|---|---|
| 0 | Sequence, time-domain and frequency-domain joint set 0 |
| 1 | Sequence, time-domain and frequency-domain joint set 1 |
| 2 | Sequence, time-domain and frequency-domain joint set 2 |
| 3 | Sequence, time-domain and frequency-domain joint set 3 |
| 4 | Sequence, time-domain and frequency-domain joint set 4 |
| 5 | Sequence, time-domain and frequency-domain joint set 5 |
| 6 | Sequence, time-domain and frequency-domain joint set 6 |
| 7 | Sequence, time-domain and frequency-domain joint set 7 |

The base station 2 selects one or more sequences of the sequence, time-domain and frequency-domain sets corresponding to different uplink receiving beam groups to send access signals. The base station 2 groups access transmitting beams according to own beam capability, different access transmitting beams in different groups are distinguished in a frequency division manner, and different access transmitting beams in the same groups are distinguished in a time division manner.

The base station 1 detects the access signals of the sequence, time-domain and frequency-domain resource sets on the receiving beam group 6, and after the base station 1 detects the uplink access signals, the base station 1 sends access response messages to the base station 2.

The response messages include uplink access signal PQIs appended to access signal recognition fields, wherein an indicator bit number is nPQI=2, indicated quality conditions and corresponding scrambling codes are shown in Table 25, and in Table 25, if numerical values in a priority column are higher, it is indicated that quality of the uplink access signals is higher

TABLE 25

| [b1 b0] | Priority |
|---|---|
| 0 0 | 3 |
| 0 1 | 2 |
| 1 0 | 1 |
| 1 1 | 0 |

The base station 2 receives response messages, recorded as RAR_txBeam0 and RAR_txBeam2 respectively, of access corresponding to a transmitting beam with a group index 0 and an intra-group index 0 and a transmitting beam with a group index 2 and an intra-group index 2, and the base station 1 demodulates PQI fields of RAR_txBeam0 and RAR_txBeam2 to select the beam with the uplink beam group index 0 and the intra-group index 0 therein as an optimal uplink transmitting beam.

Example 4

It is supposed that a terminal 1 receives access signals by utilizing 4 receiving beam groups, and the terminal 1 may substantially cover a receiving area required to be covered by the terminal 1 by utilizing the 4 receiving beam groups. The terminal 1 and a terminal 2 predefine that 4 access signal sequence, time-domain and frequency-domain resource sets correspond to the 4 receiving beam groups respectively, In an alternative way, the terminal 2 is notified of a corresponding relationship, between the access signal sequence, time-domain and frequency-domain resource sets and 8 receiving beam groups, of the terminal 1 through high-layer signaling, as shown in Table 26.

TABLE 26

| Receiving beam group | Sequence, time-domain and frequency-domain resource set |
|---|---|
| 0 | Sequence, time-domain and frequency-domain resource set 0 |
| 1 | Sequence, time-domain and frequency-domain resource set 1 |
| 2 | Sequence, time-domain and frequency-domain resource set 2 |
| 3 | Sequence, time-domain and frequency-domain resource set 3 |
| 4 | Sequence, time-domain and frequency-domain resource set 4 |
| 5 | Sequence, time-domain and frequency-domain resource set 5 |
| 6 | Sequence, time-domain and frequency-domain resource set 6 |
| 7 | Sequence, time-domain and frequency-domain resource set 7 |

The terminal 2 detects downlink signals and receives high-layer signaling of a base station to recognize access signal sequence, time-domain and frequency-domain resource set information of the terminal 2, and the terminal 1 selects one or more of the sequence, time-domain and frequency-domain resource sets corresponding to different receiving beam groups to send uplink access signals. The terminal 1 groups transmitting beams according to own beam capability, different uplink transmitting beams in different groups are distinguished in a code division manner, and different uplink transmitting beams in the same groups are distinguished in a frequency division manner.

The corresponding relationship between the receiving beam groups and the access signal sequence, time-domain and frequency-domain resource sets may also be predetermined between the terminals.

The terminal 2 receives the access signals of one or more in the sequence, time-domain and frequency-domain resource set 6 selected by the terminal 1.

The terminal 2 detects the uplink access signal sequence, time-domain and frequency-domain resource sets on the receiving beam groups, and the terminal 2 sends access response messages to the terminal 1 after detecting the access signals.

The terminal 1 confirms a transmitting beam meeting transmission according to the received access response messages corresponding to the transmitting beams.

Some combined solutions may be generated by the solutions of each of the abovementioned embodiments in a certain combination manner, information of the receiving beams may be recognized by utilizing the uplink access signal time-domain and frequency-domain resource sets and the adopted sequences, and the information bits after the uplink access signals or the implicit bits indicate uplink access quality indications. All of the combined solutions of each solution in the embodiments of the present disclosure fall within the scope of protection of the present disclosure.

The uplink access signals in the embodiments of the present disclosure may be random access signals in an LTE system, and the sequences are random access signal preamble sequences or newly designed uplink access signal or uplink access sequences, as long as all the signals and sequences capable of realizing an uplink access function and/or an uplink synchronization function fall within the scope of protection of the present disclosure.

There are many manners for optimal sequence detection of the terminal in the embodiments of the present disclosure, all of which are detection implementation manners. For example, a sequence correlation manner is adopted, and a sequence index with a maximum correlation value is selected for feedback. Different sequence indexes may be selected according to different criterions, and there is no limited relationship in the present disclosure. Any detection manner in which one or more optimal values may be calculated and a corresponding index value may be obtained falls within the scope of the protection thought of the present disclosure.

Figure 7:
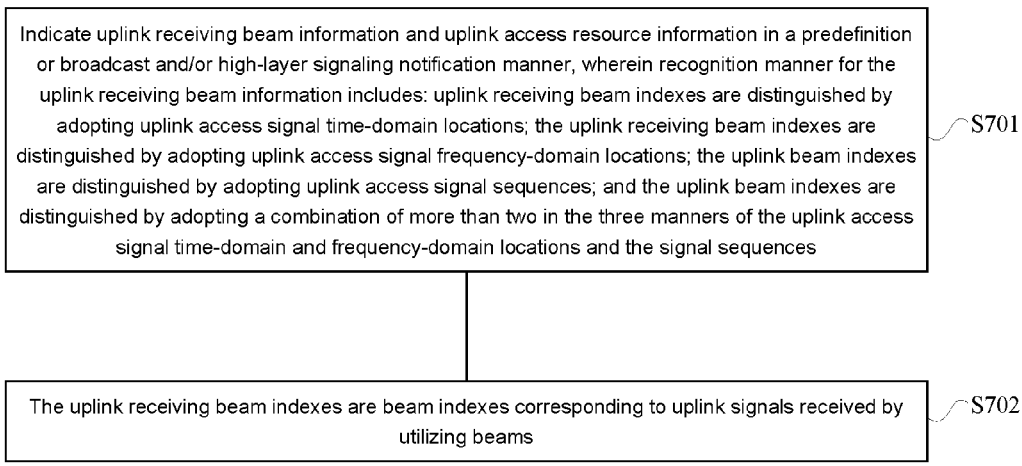
FIG. 7 is a schematic diagram of implementing uplink receiving beam index processing according to an embodiment of the present disclosure.

From the descriptions made above, it can be seen that operations for implementing downlink beam index processing in the embodiments of the present disclosure may be shown in FIG. 7.

The base station notifies adoption of at least one of the following beam indication manners and related configuration information for covering uplink receiving beam groups during sending of uplink access signals in a predetermined manner and/or a broadcast and/or high-layer signaling: the uplink receiving beam groups are indicated by adopting uplink access signal time-domain resource sets; the uplink receiving beam groups are indicated by adopting uplink access signal frequency-domain resource sets; the uplink receiving beam groups are indicated by adopting uplink access signal sequences; response messages of the uplink access signals carry indication bit information to indicate quality of the uplink access signals; indication bits carried in the response messages of the uplink access signals may exist in the response messages in an explicit or implicit manner; and the uplink receiving beam groups are uplink receiving beam groups for receiving the uplink access signals in a beamforming manner.

Embodiment 8

Figure 8:
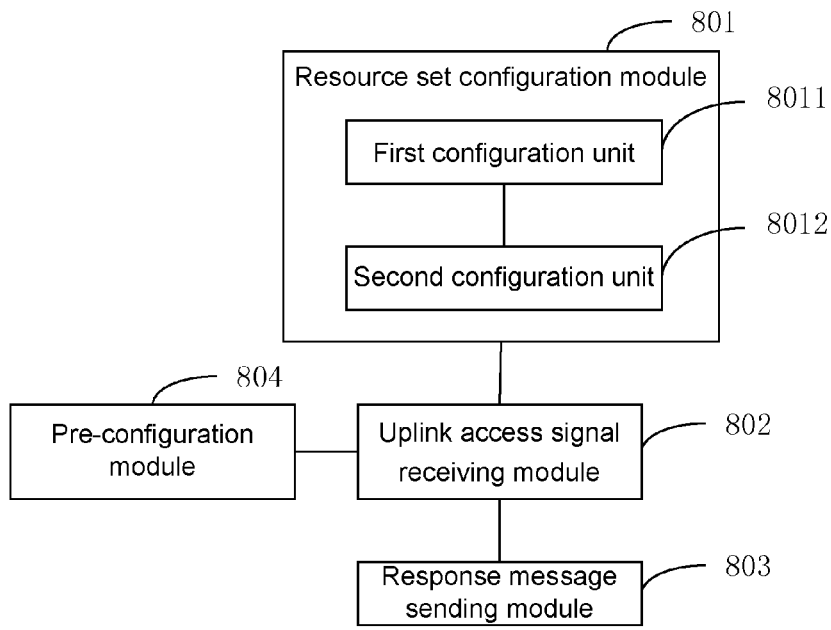
FIG. 8 is a structure diagram of a device for uplink synchronization according to embodiment eight of the present disclosure.

The embodiment of the present disclosure provides a device for uplink synchronization, and its structure is shown in FIG. 8, and includes: a resource set configuration module 801, configured to configure resource set information corresponding to N uplink receiving beam groups, wherein N>0 and each uplink receiving beam group includes at least one uplink receiving beam; an uplink access signal receiving module 802, configured to detect uplink access signals on resource sets corresponding to one or more receiving beams according to the resource set information; and a response message sending module 803, configured to send uplink access response messages in responsive to uplink access signals meeting an uplink access condition after the uplink access signals are detected.

In certain embodiments, the resource set configuration module 801 includes: a first configuration unit 8011, configured to send the resource set information corresponding to the uplink receiving beam groups to a second communication node through a broadcast and/or high-layer signaling; and a second configuration unit 8012, configured to, by a first communication node which has established a connection with the second communication node and corresponds to another carrier, send the resource set information corresponding to the uplink receiving beam groups to the second communication node through high-layer signaling, wherein the first communication node corresponding to the other carrier may be a local first communication node or another first communication node at a separate physical location.

In certain embodiments, the device further includes: a pre-configuration module 804, configured to predetermine the corresponding resource set information with the second communication node.

The uplink synchronization device shown in FIG. 8 may be integrated into a base station or a terminal, and then the base station or the terminal realizes a corresponding function.

Figure 9:
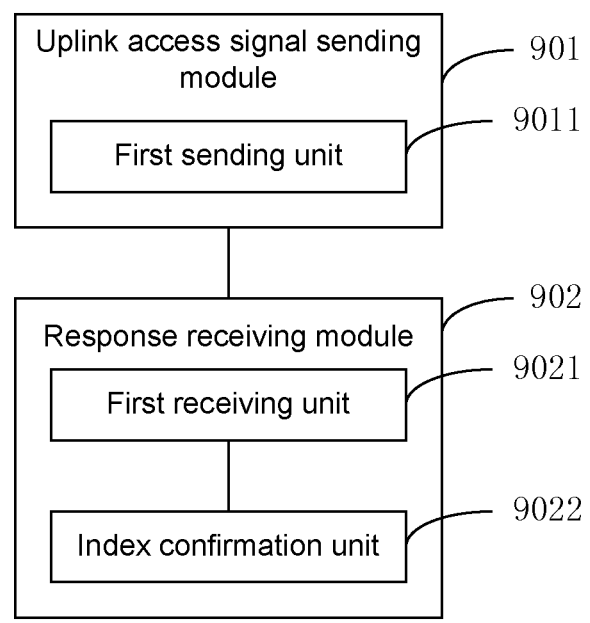
FIG. 9 is a structure diagram of another uplink synchronization device according to embodiment eight of the present disclosure.
Figure 10:
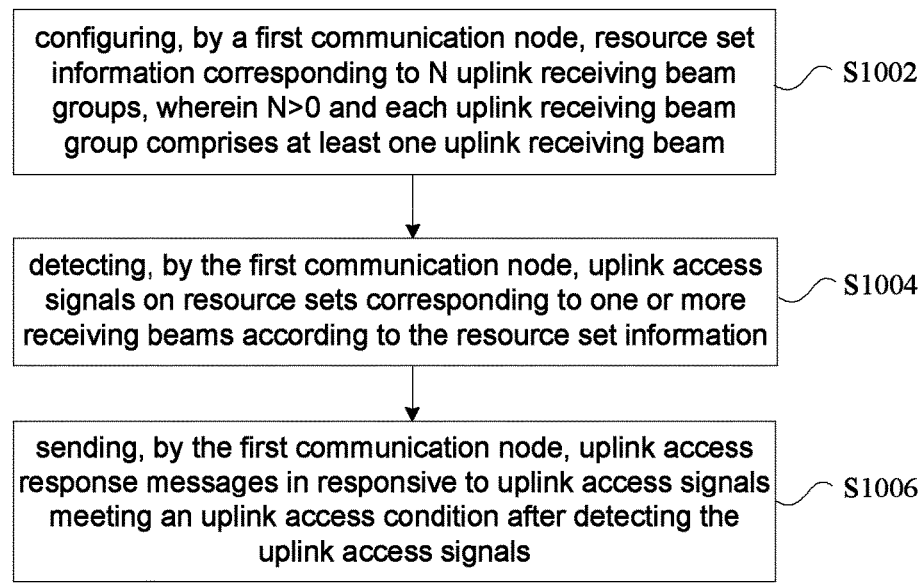
FIG. 10 is a flowchart of a method for uplink synchronization according to an embodiment of the present disclosure.

The embodiment of the present disclosure further provides a device for uplink synchronization, and its structure is shown in FIG. 9, and includes: an uplink access signal sending module 901, configured to receive resource set information configured by a first communication node and corresponding to N uplink receiving beam groups, and send uplink access signals by adopting uplink transmitting beams on M corresponding resource sets according to the resource set information, wherein M>0, N>0, 1<=M<=N and each uplink receiving beam group includes at least one uplink receiving beam; and a response receiving module 902, configured to receive uplink access response messages fed back by the first communication node.

In certain embodiments, the uplink access signal sending module 901 includes: a first sending unit 9011, configured to divide the uplink transmitting beams into M groups, and send different uplink access signals by adopting different uplink transmitting beam groups, wherein M>0, each uplink transmitting beam group includes at least one uplink transmitting beam, and each grouped uplink transmitting beam is uniquely confirmed through a corresponding group index and an intra-group index.

In certain embodiments, the response receiving module 902 includes: a first receiving unit 9021, configured to receive the uplink access response messages on different uplink access resource sets, wherein the different uplink access resource sets being any one of: different time resource sets, different frequency resource sets and different beam resource sets; an an index confirmation unit 9022, configured to determine a corresponding group index and intra-group index of an uplink transmitting beam meeting an uplink access condition according to the uplink access response messages corresponding to the different uplink access resource sets.

The uplink synchronization device shown in FIG. 9 may be integrated into base station a base station or a terminal, and then the base station or the terminal realizes a corresponding function.

The embodiment of the present disclosure further provides A system for uplink synchronization, which includes a first communication node and a second communication node, wherein the first communication node is base station a base station or a terminal, and is integrated with the uplink synchronization device shown in FIG. 8; and the second communication node is base station a base station or a terminal, and is integrated with the uplink synchronization device shown in FIG. 9.

The first communication node is configured to configure resource set information corresponding to N uplink receiving beam groups, wherein N>0 and each uplink receiving beam group includes at least one uplink receiving beam, detect uplink access signals on resource sets corresponding to one or more receiving beams according to the resource set information, and send uplink access response messages in responsive to uplink access signals meeting an uplink access condition after detecting the uplink access signals; and the second communication node is configured to receive the resource set information, configured by the first communication node, corresponding to the N uplink receiving beam groups, send the uplink access signals by adopting uplink transmitting beams on M corresponding resource sets according to the resource set information, wherein M>0, N>0, 1<=M<=N and each uplink receiving beam group includes at least one uplink receiving beam, and receive the uplink access response messages fed back by the first communication node.

The embodiments of the present disclosure provide the uplink synchronization device and system, which may be combined with the uplink synchronization method provided by the embodiments of the present disclosure. The first communication node configures the resource set information corresponding to the N uplink receiving beam groups, wherein N>0 and each uplink receiving beam group includes at least one uplink receiving beam, and then the first communication node detects the uplink access signals on the resource sets corresponding to the one or more receiving beams according to the resource set information, and sends the uplink access response messages to the uplink access signals meeting the uplink access condition after detecting the uplink access signals. The second communication node receives the resource set information, configured by the first communication node, corresponding to the N uplink receiving beam groups, and sends the uplink access signals by adopting the uplink transmitting beams on the M corresponding resource sets according to the resource set information, wherein M>0, N>0 and 1<=M<=N; and the second communication node receives the uplink access response messages fed back by the first communication node. Configuration confirmation of both communication parties about uplink access beams is implemented, and the problem that the first communication node and the second communication node may not perform normal communication is solved.

From the above, it can be seen that: no matter in the method, device and system in the embodiments of the present disclosure, the terminal covers the uplink receiving beam groups of the base station on the basis of different time-domain resource sets and/or different frequency-domain resource sets and/or different uplink access signal sequences in the predefinition or broadcast and/or high-layer signaling receiving manner. The base station selects and determines the time-domain resource sets and/or frequency-domain resource sets where the uplink access signals are located and/or the adopted sequences to obtain the uplink access signals sent by the terminal, and sends the uplink access response messages after successfully receiving the uplink access signals. The uplink access response messages may carry uplink access signal PQI bits indicating uplink access quality. In such a manner, the terminal may obtain the uplink transmitting beam meeting uplink transmission or the optimal uplink transmitting beam, and the base station may select the beam meeting uplink reception or the optimal uplink receiving beam, so that subsequent reliable information transmission is ensured.

Those skilled in the art should know that all or part of the steps of the abovementioned embodiments may be implemented by utilizing a flow of a computer program, the computer program may be stored in a computer-readable storage medium, the computer program is executed on a corresponding hardware platform (such as a system, equipment, device and apparatus), and during execution, one or combination of steps of the method embodiments is included.

In certain embodiments, all or part of the steps of the abovementioned embodiments may also be implemented by utilizing an integrated circuit, these steps may form multiple integrated circuit modules, or multiple modules or steps therein may form a single integrated circuit module for implementation. Therefore, the present disclosure is not limited to any specific hardware and software combination.

Each device/function module/function unit in the abovementioned embodiments may be implemented by adopting a universal computing device, and they may be concentrated on a single computing device, and may also be distributed on a network formed by multiple computing devices.

When being implemented in form of software function module and sold or used as an independent product, each device/function module/function unit in the abovementioned embodiments may be stored in a computer-readable storage medium. The abovementioned computer-readable storage medium may be a read-only memory, a magnetic disk, an optical disk or the like.

Any variations or replacements apparent to those skilled in the art within the technical scope of the present disclosure shall fall within the scope of protection of the present disclosure. Therefore, the scope of protection of the present disclosure should be subject to the scope of protection of the claims.

INDUSTRIAL PRACTICABILITY

By the technical solutions, configuration confirmation of both communication parties about uplink access beams is implemented, and normal communication between the first communication node and the second communication node is implemented.

What is claimed is:

1. A method for uplink synchronization, comprising:
configuring, by a first communication node, resource set information corresponding to N uplink receiving beam groups, wherein N is a positive integer and each uplink receiving beam group comprises at least one uplink receiving beam;
detecting, by the first communication node, uplink access signals on resource sets corresponding to one or more receiving beams according to the resource set information; and
sending, by the first communication node, uplink access response messages in responsive to uplink access signals meeting an uplink access condition after detecting the uplink access signals.

2. The method according to claim 1, wherein configuring, by a first communication node, the resource set information corresponding to the N uplink receiving beam groups in at least one of the following manners:
the first communication node sends the resource set information corresponding to the uplink receiving beam groups to a second communication node through a broadcast and/or high-layer signaling; and
another first communication node which has established a connection with the second communication node and corresponds to another carrier sends the resource set information corresponding to the uplink receiving beam groups to the second communication node through high-layer signaling, wherein the another first communication node corresponding to the other carrier and the first communication node are the same first communication node, or they are different first communication nodes at separate physical locations.

3. The method according to claim 1, further comprising:
predetermining, by the first communication node, the corresponding resource set information with the second communication node.

4. The method according to claim 1, wherein the resource set information corresponding to the uplink receiving beam groups is divided in any one or more of the following manners:
different uplink receiving beams are divided by utilizing frequency-domain resource sets;
different uplink receiving beams are divided by utilizing time-domain resource sets; and
different uplink receiving beams are divided by utilizing code-domain resource sets.

5. The method according to claim 1, wherein the uplink access response messages comprise any one or more of the following information:
frequency-domain resource sets corresponding to the uplink access signals;
time-domain resource sets corresponding to the uplink access signals; and
code-domain resource sets corresponding to the uplink access signals.

6. The method according to claim 1, wherein the uplink access response messages further comprise:
uplink access signal Preamble Quality Indicators (PQIs) which indicate quality of the uplink access signals received by the first communication node.

7. The method according to claim 1, wherein the first communication node is a base station or a terminal, and the second communication node is a base station or a terminal.

8. A method for uplink synchronization, comprising:
receiving, by a second communication node, resource set information configured by a first communication node and corresponding to N uplink receiving beam groups, and sending uplink access signals by adopting uplink transmitting beams on M corresponding resource sets according to the resource set information, wherein M and N are positive integers, 1<=M<=N and each uplink receiving beam group comprises at least one uplink receiving beam; and
receiving, by the second communication node, uplink access response messages fed back by the first communication node.

9. The method according to claim 8, wherein the second communication node sends the uplink access signals by adopting the uplink transmitting beams in the following manner:
the second communication node divides the uplink transmitting beams into M groups, and sends different uplink access signals by adopting different uplink transmitting beam groups, wherein M>0, each uplink transmitting beam group comprises at least one uplink transmitting beam, and each grouped uplink transmitting beam is uniquely confirmed through a corresponding group index and an intra-group index.

10. The method according to claim 8, wherein receiving, by the second communication node, the uplink access response messages fed back by the first communication node comprises:
receiving, by the second communication node, the uplink access response messages on different uplink access resource sets, the different uplink access resource sets being any one of: different time resource sets, different frequency resource sets, and different beam resource sets;
determining, by the second communication node, a corresponding group index and intra-group index of an uplink transmitting beam meeting an uplink access condition according to the uplink access response messages corresponding to the different uplink access resource sets.

11. The method according to claim 10, wherein the second communication node divides the uplink transmitting beams into multiple uplink transmitting beam groups according to any one or more of the following manners:
different beams correspond to different time resource sets;
different beams correspond to different frequency resource sets; and
different beams correspond to different sequence resource sets.

12. The method according to claim 8, wherein
the second communication node divides the uplink transmitting beams into multiple uplink transmitting beam groups according to any one or more of the following manners:
different groups correspond to different time resource sets;
different groups correspond to different frequency resource sets; and
different groups correspond to different sequence resource sets.

13. The method according to claim 8, wherein the first communication node is a base station or a terminal, and the second communication node is a base station or a terminal.

14. A device for uplink synchronization, comprising:
a resource set configuration module, configured to configure resource set information corresponding to N uplink receiving beam groups, wherein N is a positive integers and each uplink receiving beam group comprises at least one uplink receiving beam;
an uplink access signal receiving module, configured to detect uplink access signals on resource sets corresponding to one or more receiving beams according to the resource set information; and
a response message sending module, configured to send uplink access response messages in responsive to uplink access signals meeting an uplink access condition after the uplink access signals are detected.

15. The device according to claim 14, wherein the resource set configuration module comprises:
a first configuration unit, configured to send the resource set information corresponding to the uplink receiving beam groups to a second communication node through a broadcast and/or high-layer signaling; and
a second configuration unit, configured to, by another first communication node which has established a connection with the second communication node and corresponds to another carrier, send the resource set information corresponding to the uplink receiving beam groups to the second communication node through high-layer signaling, wherein the another first communication node corresponding to the other carrier and the first communication node are the same first communication node, or they are different first communication nodes at separate physical locations.

16. The device according to claim 14, further comprising:
a pre-configuration module, configured to predetermine the corresponding resource set information with the second communication node.

17. A device for uplink synchronization, comprising:
an uplink access signal sending module, configured to receive resource set information configured by a first communication node and corresponding to N uplink receiving beam groups, and send uplink access signals by adopting uplink transmitting beams on M corresponding resource sets according to the resource set information, wherein M and N are positive integers, $1<=M<=N$ and each uplink receiving beam group comprises at least one uplink receiving beam; and
a response receiving module, configured to receive uplink access response messages fed back by the first communication node.

18. The device according to claim 17, wherein the uplink access signal sending module comprises:
a first sending unit, configured to divide the uplink transmitting beams into M groups, and send different uplink access signals by adopting different uplink transmitting beam groups, wherein $M>0$, each uplink transmitting beam group comprises at least one uplink transmitting beam, and each grouped uplink transmitting beam is uniquely confirmed through a corresponding group index and an intra-group index.

19. The device according to claim 17, wherein the response receiving module comprises:
a first receiving unit, configured to receive the uplink access response messages on different uplink access resource sets, wherein the different uplink access resource sets being any one of: different time resource sets, different frequency resource sets and different beam resource sets;
an index confirmation unit, configured to determine a corresponding group index and intra-group index of an uplink transmitting beam meeting an uplink access condition according to the uplink access response messages corresponding to the different uplink access resource sets.

20. A system for uplink synchronization, comprising a first communication node and a second communication node, wherein
the first communication node comprises the uplink synchronization device as claimed in claim 14; and
the second communication node comprises the uplink synchronization device as claimed in claim 17.

* * * * *